(12) United States Patent
Takeda et al.

(10) Patent No.: US 10,912,043 B2
(45) Date of Patent: Feb. 2, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Kazuaki Takeda, Tokyo (JP); Satoshi Nagata, Tokyo (JP); Lihui Wang, Beijing (CN); Qin Mu, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/334,879

(22) PCT Filed: Sep. 21, 2017

(86) PCT No.: PCT/JP2017/034014
§ 371 (c)(1),
(2) Date: Mar. 20, 2019

(87) PCT Pub. No.: WO2018/056338
PCT Pub. Date: Mar. 29, 2018

(65) Prior Publication Data
US 2020/0022098 A1 Jan. 16, 2020

(30) Foreign Application Priority Data
Sep. 21, 2016 (JP) ................................ 2016-184787

(51) Int. Cl.
*H04W 52/48* (2009.01)
*H04L 5/00* (2006.01)
(Continued)

(52) U.S. Cl.
CPC ............ *H04W 52/48* (2013.01); *H04L 5/0082* (2013.01); *H04W 52/143* (2013.01); *H04W 72/042* (2013.01); *H04W 80/08* (2013.01)

(58) Field of Classification Search
CPC .. H04L 5/0082; H04W 28/04; H04W 52/143; H04W 52/48; H04W 72/04; H04W 72/042; H04W 72/12; H04W 80/08
See application file for complete search history.

(56) References Cited

U.S. PATENT DOCUMENTS

| 2016/0182213 A1 | 6/2016 | Golitschek Edler von Elbwart et al. |
| 2018/0279266 A1* | 9/2018 | Li .......................... H04L 1/1896 |

(Continued)

OTHER PUBLICATIONS

International Search Report issued in PCT/JP2017/034014 dated Dec. 12, 2017 (1 page).

(Continued)

*Primary Examiner* — Saad A. Waqas
(74) *Attorney, Agent, or Firm* — Osha Bergman Watanabe & Burton LLP

(57) ABSTRACT

The present invention is designed to properly control the transmission of UL signals transmitted in response to DL transmission, in future radio communication systems. A receiving section that receives downlink control information and downlink data, and a control section that controls the transmission of an acknowledgment signal in response to the downlink data, are provided, and the control section controls the timing for transmitting the delivery acknowledgment signal based on timing information included in the downlink control information.

5 Claims, 15 Drawing Sheets

(51) Int. Cl.
*H04W 52/14* (2009.01)
*H04W 72/04* (2009.01)
*H04W 80/08* (2009.01)

(56) References Cited

U.S. PATENT DOCUMENTS

2018/0332576 A1* 11/2018 Oh .................. H04W 16/14
2019/0159191 A1* 5/2019 Kim .................. H04W 76/27

OTHER PUBLICATIONS

Written Opinion of the International Searching Authority issued in PCT/JP2017/034014 dated Dec. 12, 2017 (4 pages).
CATT; "HARQ and scheduling timing design for LTE short TTI"; 3GPP TSG RAN WG1 Meeting #86, R1-166461; Gothenburg, Sweden; Aug. 22-26, 2016 (3 pages).
Samsung; "Overview of latency reduction operation with subframe TTI for FS2"; 3GPP TSG RAN WG1 Meeting #86, R1-166693; Gothenburg, Sweden; Aug. 22-26, 2016 (5 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TSG RAN WG1 Meeting #86; R1-166105 "Discussion on timing relations for NR frame structure" Huawei, HiSilicon; Gothenburg, Sweden; Aug. 22-26, 2016 (4 pages).
3GPP TSG RAN WG1 #86; R1-166756 "Discussion on UL control channel structure for NR" Samsung; Gothenburg, Sweden; Aug. 22-26, 2016 (3 pages).
3GPP TSG RAN WG1 Meeting #82; R1-153772 "Dynamic adaptation of PUCCH formats with HARQ-ACK feedback for carrier aggregation enhancement beyond 5 carriers" Huawei, HiSilicon; Beijing, China; Aug. 24-28, 2015 (3 pages).
Extended European Search Report issued in European Application No. 17853108.3, dated Apr. 21, 2020 (9 pages).
Office Action issued in the counterpart Russian Patent Application No. 2019110597/07(020344), dated Oct. 13, 2020 (12 pages).

* cited by examiner

| UL/DL CONFIGU-RATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8 7, 5, 4, 11, 6 | - | - | - | - | - | - | - |
| 6 | - | - | 7 | 7 | 5 | - | - | 7 | 7 | - |

FIG. 8

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and/or the like).

In existing LTE systems (for example, LTE Rel. 8 to 13), downlink (DL) communication and/or uplink (UL) communication are carried out by using 1-ms transmission time intervals (TTIs) (also referred to as "subframes" and/or the like). This 1-ms TTI is the unit of time it takes to transmit one channel-encoded data packet, and is the processing unit in, for example, scheduling, link adaptation, retransmission control (HARQ (Hybrid Automatic Repeat reQuest)) and so on.

Also, in existing LTE systems (for example, LTE Rel. 8 to 13), frequency division duplex (FDD) and time division duplex (TDD) are supported as duplex schemes. FDD is a scheme to assign different frequencies to DL and UL, and is also referred to as "frame structure (FS) type 1 (FS 1)." TDD is a scheme to switch between DL and UL over time in the same frequency, and is also referred to as "frame structure type 2 (FS 2)." In TDD, communication is carried out based on UL/DL configurations, which define the formats of UL subframes and DL subframes in radio frames.

Also, in existing LTE systems (for example, LTE Rel. 8 to 13), the timing for transmitting retransmission control information (including, for example, ACK (ACKnowledgement) or NACK (Negative ACK), A/N, HARQ-ACK and so on, and these hereinafter will be collectively referred to as "A/N") in response to a DL shared channel (for example, a physical downlink shared channel, which hereinafter will be referred to as "PDSCH") (and this timing will be hereinafter also referred to as "DL HARQ timing" and so on) is controlled by taking into account the signal processing time and the like in user terminals and/or radio base stations, and on assumption that the reference value for the timing for transmission is fixed at 4 ms.

For example, in FDD in existing LTE systems (for example, LTE Rel. 8 to 13), when a PDSCH is received in subframe #n, an A/N is transmitted (as feedback) in response to this PDSCH in subframe #n+4, on assumption that the time it takes for a user terminal to process the PDSCH and/or others is 4 ms. Furthermore, in TDD, when a PDSCH is received in DL subframe #n, an A/N is transmitted in response to this PDSCH in subframe #n+4 or a later UL subframe, depending on the UL/DL configuration, on assumption that the time it takes for a user terminal to process the PDSCH and/or others is 4 ms.

Also, in existing LTE systems (for example, LTE Rel. 8 to 13), the timing for transmitting A/Ns in response to an uplink shared channel (for example, a physical uplink shared channel, which hereinafter will be referred to as "PUSCH") (this timing will be also referred to as "UL HARQ timing" and/and so on) is also controlled by using 4 ms as a fixed reference value for the timing for signal transmission in user terminals and/or radio base stations.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Now, envisaging future radio communication systems (for example, LTE Rel. 14, 15 and later versions, 5G, NR and so forth), radio frames (also referred to as "lean radio frames") to provide good future scalability and excellent power saving performance are under study. Unlike existing LTE systems, in which predetermined UL/DL configurations are used, studies are in progress structure these radio frames so that the direction of communication such as UL and DL can be changed dynamically (this scheme is also referred to as "highly flexible dynamic TDD").

Furthermore, future radio communication systems are required to reduce latency (also referred to as "latency reduction") in order to provide communication services having strict requirements on latency, such as URLLC. As for the method of reducing latency, it may be possible to introduce TTIs (short TTIs) that are shorter than 1-ms subframes, and/or shorten the processing time (apply shortened processing time) while keeping 1-ms subframes as processing units for controlling communication.

In this case, if the timings for transmitting and receiving signals (for example, the timing for transmitting UL signals in response to DL transmission such as A/Ns, and so forth) in existing LTE systems (for example, LTE Rel. 8 to 13) are used, there is a possibility that UL transmission cannot be controlled properly.

The present invention has been made in view of the above, and it is therefore an object of the present invention to provide a user terminal and a radio communication method, whereby the transmission of UL signals in response to DL transmission can be controlled properly in future radio communication systems.

Solution to Problem

A user terminal, according to one aspect of the present invention, has a receiving section that receives downlink control information and downlink data, and a control section that controls transmission of an acknowledgment signal in response to the downlink data, and the control section controls a timing for transmitting the delivery acknowledgment signal based on timing information included in the downlink control information.

Advantageous Effects of Invention

According to the present invention, it is possible to appropriately control the transmission of UL signals in response to DL transmission in future radio communication systems.

BRIEF DESCRIPTION OF DRAWINGS

FIG. 8 is a diagram to show a table in which M and $k_m$ for use in PUCCH transmission are defined;

DESCRIPTION OF EMBODIMENTS

Figure 1A:
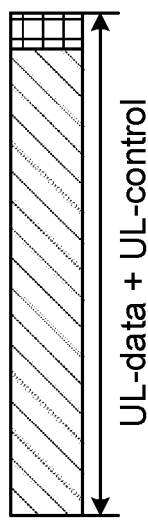
FIGS. 1A to 1G are diagrams to show examples of frame structures that can be used in the present embodiment.

Existing LTE systems (LTE Rel. 8 to 13) support hybrid automatic repeat request (HARQ) in order to prevent degradation of communication quality between user terminals (UE (User Equipment)) and radio base stations (eNode B (eNode B)).

In the DL of existing LTE systems, a user terminal transmits an acknowledgment signal (also referred to as a "retransmission control signal," an "HARQ-ACK," an "ACK/NACK," an "A/N," and so on) in response to a DL signal (for example, a PDSCH) based on the result of the receipt of this PDSCH. The user terminal can transmit the A/N by using an uplink control channel (for example, a PUCCH) and/or an uplink shared channel (for example, a PUSCH). The radio base station controls the transmission of the PDSCH (including initial transmission and/or retransmission) based on the A/N from the user terminal. Also, in the UL of existing LTE systems, the user terminal transmits uplink data (for example, a PUSCH), scheduled by UL grants transmitted from the radio base station.

In existing LTE systems, A/N transmission, UL data transmission, and so on are controlled a certain period of time after subframes in which DL signals are transmitted/received, based on predefined transmission timings. For example, in FDD, a user terminal transmits an A/N in response to a PDSCH in the subframe that is located 4 ms after the subframe in which the PDSCH was received. Also, the user terminal transmits a PUSCH in response to a UL grant in the subframe that is located 4 ms after the subframe in which the UL grant was received.

Future radio communication systems (5G/NR) are expected to reduce latency in communication, and studies are in progress to shorten the processing time for signal transmission/receipt compared to existing LTE systems. As for the method of enabling reduction of processing time, communication may be controlled in subframe units (1-ms TTIs) as in existing LTE systems, and, apart from this, setting up shorter processing time than the processing time in existing LTE systems.

Here, the processing time (for example, the processing time in LTE Rel. 8 to 13) in existing LTE systems may be referred to as "normal processing time." Processing time shorter than the normal processing time may be referred to as "shortened processing time." A user terminal where shortened processing time is configured controls transmitting/receiving processes (for example, encoding) for predetermined signals so that these signals are transmitted/received at earlier timings than the transmission/receiving timings defined in existing LTE systems. Shortened processing time may be configured for specific processes (may be configured in various units, such as per signal, per process, etc.), or configured in all processes.

For example, if shortened processing time is configured when TTIs of 1 ms (which may be also referred to as "subframes," "slots," or "scheduling units," and so forth) are used, the user terminal controls certain operations to be processed at earlier timings than in existing systems by using existing channels (PDCCH, PDSCH, PUSCH, PUCCH and/or other channels). In user terminals where shortened processing time is configured, the following times in existing LTE systems are likely to become shorter than a certain length of time (for example, 4 ms):

(1) the time it takes, after DL data is received, until an HARQ-ACK is transmitted in response, and/or the time it takes, after an HARQ-ACK is transmitted, until DL data is received in response; and (2) the time it takes, after a UL grant is received, until UL data is transmitted in response, and/or the time it takes, after UL data is transmitted, until a UL grant is received in response.

Note that shortened processing time may be defined in the specification in advance, or reported to (configured in, indicated to, etc.) UE by using higher layer signaling (for example, radio resource control (RRC) signaling, broadcast information (including, for example, the master information block (MIB), system information blocks (SIBs), etc.), medium access control (MAC) signaling and so forth), physical layer signaling (for example, downlink control information (DCI)) and/or other signals, or by combining these.

Also, as a method for enabling reduction of latency in communication, it may be possible to control transmission/receipt of signals by introducing shortened TTIs (which may be referred to as "short TTIs," "mini slots," "short scheduling units" etc.), which are shorter in duration than subframes (1 ms) in existing LTE systems. Here, a TTI having a time duration of 1 ms like existing subframes (for example, TTIs in LTE Rel. 8 to 13) may be referred to as a "normal TTI (nTTI)." A TTI that is shorter than an nTTI may be referred to as a "shortened TTI (sTTI)."

When sTTIs are used, the time margin for processing (for example, encoding, decoding, etc.) in UE and/or eNB grows, so that the processing latency can be reduced. Also, when sTTIs are used, it is possible to increase the number of UEs that can be accommodated per unit time (for example, 1 ms).

A user terminal where sTTIs are configured will use channels of shorter time units than existing data and control channels. For example, a shortened downlink control channel (sPDCCH (shortened PDCCH)), a shortened downlink data channel (sPDSCH (shortened PDSCH)), a shortened uplink control channel (sPUCCH (shortened PUCCH)), a shortened uplink data channel (sPUSCH (shortened PUSCH)), and so forth are under study, as shortened channels to be transmitted and/or received in sTTIs. The above-noted shortened processing time of (1) and/or (2) may be configured even for UEs where sTTIs are configured.

Also, future radio communication systems are under research to introduce a number of frame structures (also referred to as "frame types," "channel formats," "subframe structures," "subframe types," "slot structures," "slot types," and so on). FIG. 1 is a diagram to show examples of frame structures (here, time structures) that are applicable to future radio communication systems. Note that the frame structure shown in FIG. 1 is simply an example, and the specific configurations of frame structures that are applicable to the present embodiment, the number of such structures and so forth are by no means limited to the example shown in FIG. 1. For example, only a part of the frame structure shown in FIG. 1 may be used.

Note that frame structures with different channel formats may not be explicitly defined as different frame structures. For example, it is also possible to define a plurality of combinations of channels and signals that are mapped to blocks of radio resources comprised of one or more symbols and one or more subcarriers, defined as common frame structures. Hereinafter, for the sake of convenience, configurations that map different channels and signals to a block of radio resources comprised of predetermined consecutive symbols and subcarriers will be referred to as "different frame structures."

Also, although examples will be shown below in which different channels are divided in the time domain, this by no means limits the frame structures. For example, a downlink data channel and a downlink control channel do not necessarily have to be divided in time, and may be frequency-multiplexed/code-multiplexed in the same time period (for example, symbol). Also, similarly, an uplink data channel and an uplink control channel do not necessarily have to be divided in time, and may be frequency-multiplexed/code-multiplexed in the same time period (for example, symbol). The following description is based on, without losing generality, an example in which different channels are divided in the time domain as shown in FIG. 1.

Figure 1B:
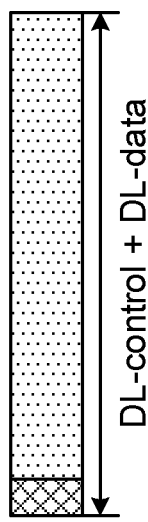
Figure 1C:
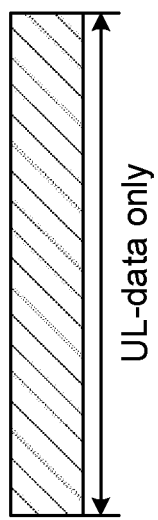

Between the frame structures shown in FIGS. 1A to 1C, the field (here, the time period) where a downlink data channel, which transmits downlink data, can be allocated varies. The downlink data channel may be referred to as a "downlink shared channel (PDSCH)." Between the frame structures shown in FIGS. 1D to 1G, the field where an uplink data channel, which transmits uplink data, can be allocated varies. The uplink data channel may be referred to as an "uplink shared channel (PUSCH)."

When performing downlink data transmission, a radio base station and a user terminal can use one of the radio frame structures of FIGS. 1A to 1C (partially or entirely), and, when performing uplink data transmission, the radio base station and the user terminal can use one of the radio frame structures of FIGS. 1D to 1G (partially or entirely). Alternatively, multiple frame structures may be switched and applied.

FIG. 1A shows a frame structure (or subframe structure) in which a downlink control channel and a downlink shared channel are arranged. In this case, the user terminal controls receipt of downlink data and/or transmission of uplink data based on downlink control information (DCI) that is transmitted in the downlink control channel. FIG. 1B shows a frame structure in which the downlink shared channel is arranged throughout the subframe (the downlink control channel is not arranged).

FIG. 1C shows a frame structure in which a downlink control channel, a downlink shared channel and an uplink control channel are arranged. The user terminal controls receipt of downlink data and/or transmission of uplink data based on downlink control information that is transmitted in the downlink control channel. Furthermore, the user terminal may feed back delivery acknowledgment signals (HARQ-ACK), in response to data that is received in the downlink shared channel, in the uplink control channel in the same time period. Note that a gap period may be provided between the downlink shared channel and the uplink control channel. Although not shown, it is also possible to provide a gap period between the uplink control channel and the starting time of the next frame or subframe.

Furthermore, assignment may be performed so that transmission/receipt control (scheduling) is completed within the same subframe, in order to enable short-time communication. This type of assignment is also referred to as "self-contained assignment." Subframes, in which self-contained assignment is performed, may be referred to as "self-containment subframes." Self-contained subframes may be referred to as "self-contained TTIs" or "self-contained symbol sets," or other names may be applied as well.

In self-contained subframes, a user terminal may receive DL data based on a downlink control channel, and also transmit a feedback signal (for example, an HARQ-ACK and/or the like) in response to that DL signal. The use of self-contained subframes can realize feedback with ultra-low latency of 1 ms or less, for example, so that the latency can be reduced.

Figure 1D:
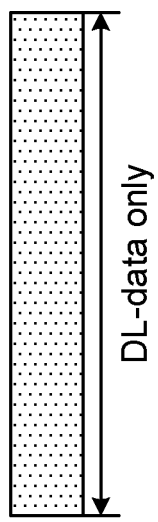
Figure 1E:
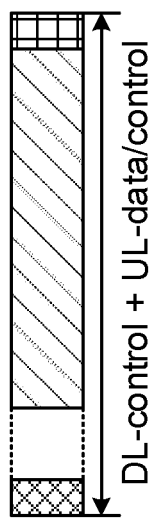

FIG. 1D shows a frame structure in which an uplink control channel and an uplink shared channel are arranged. In this case, the user terminal transmits uplink data in the uplink shared channel and transmits uplink control signals in the uplink control channel. FIG. 1E shows a frame structure in which an uplink shared channel is arranged over subframes (uplink control channel is not allocated).

Figure 1F:
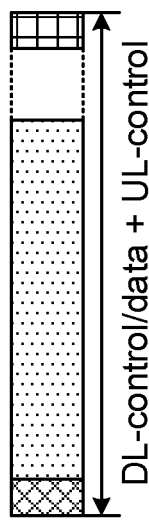
Figure 1G:
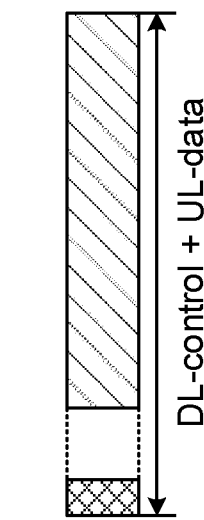

FIG. 1F shows a frame structure in which a downlink control channel, an uplink shared channel, and an uplink control channel are arranged. Based on downlink control information that is transmitted in the downlink control channel, the user terminal can transmit UL signals (UL data, measurement report, etc.) in the same (or subsequent) subframe. Furthermore, assignment may be performed so that transmission/receipt control (scheduling) is completed within the same subframe, in order to enable short-time communication. FIG. 1G shows a frame structure in which a downlink control channel and an uplink shared channel are arranged. Note that a gap period may be provided between the downlink control channel and the uplink shared channel. Although not shown, it is also possible to provide a gap period between the uplink control channel and the starting time of the next frame or subframe.

Thus, in future radio communication systems, there is the possibility that shortened processing time and/or multiple frame structures will be introduced. Meanwhile, the problem when shortened processing time and/or multiple frame structures are introduced is how to control transmission/receipt of signals (for example, the timing for transmission and receipt) and so on. For example, if signal transmission/ receiving timings (for example, the timing for transmitting UL signals in response to DL transmission such as A/Ns) used in existing LTE systems (for example, LTE Rel. 8 to 13) are used, there is a possibility that UL transmission cannot be controlled properly, and the advantage of introducing shortened processing time and/or multiple frame structures cannot be achieved.

Depending on what shortened processing time is applied, it may also be possible to use a reference value that is lower than the reference value for the timing of transmission in existing systems, as a fixed value. However, when the direction of communication such as UL and DL (multiple frame structures) are controlled so as to be changed flexibly, making the timing for transmitting UL signals in response to DL transmission a fixed value would only make it difficult to control the radio frame structure in a flexible way.

The present inventors have focused on the point that future radio communication will make it necessary to control the timing for transmission and receipt in a flexible way, and come up with the idea of controlling the transmission of UL signals in response to DL transmission in a flexible way. So, according to one aspect of the present embodiment, timing information, which relates to the timing for transmitting feedback of UL signals (for example, A/Ns and the like) in response to DL transmission, is reported to a user terminal, so as to control the feedback of the UL signals.

Based on this timing information, the user terminal can control the transmission of A/Ns and/or the like, and, consequently, change the direction of communication (multiple frame structures) such as UL and DL, and/or the processing time, in a flexible way, and use these. In addition, the radio base station can flexibly control the timing for transmitting UL signals from the user terminal and/or other timings based on the communicating environment and the like.

Now, embodiments of the present invention will be described below in detail with reference to the accompanying drawings. Note that the radio communication methods according to the herein-contained embodiments may be applied individually or may be applied in various combinations.

Also, in the following embodiments, the time interval of a DL signal that is transmitted in response to a UL signal such as an A/N may be the same as a subframe (1 ms) in existing LTE, may be shorter in duration than 1 ms (for example, one symbol to thirteen symbols), or may be longer in duration than 1 ms. Note that this time interval may be referred to as a "normal TTI," a "subframe," a "slot," a "mini-slot," a "scheduling unit," a "short TTI," a "short scheduling unit" and so forth.

Also, although A/Ns (HARQ-ACKs, ACKs/NACKs and so on) will be described in the following description as examples of UL signals that are transmitted in response to DL transmission, A/Ns are by no means the only signals that are applicable to the present embodiment. Signals other than A/Ns (for example, UL data, channel state information, measurement reference signals, etc.) can be applied to the present embodiment as well.

(First Aspect)

A case will be described below with a first aspect of the present invention where the timing for transmitting A/Ns in response to DL transmission is controlled based on predetermined information.

<Timing for A/N Transmission>

Figure 2:
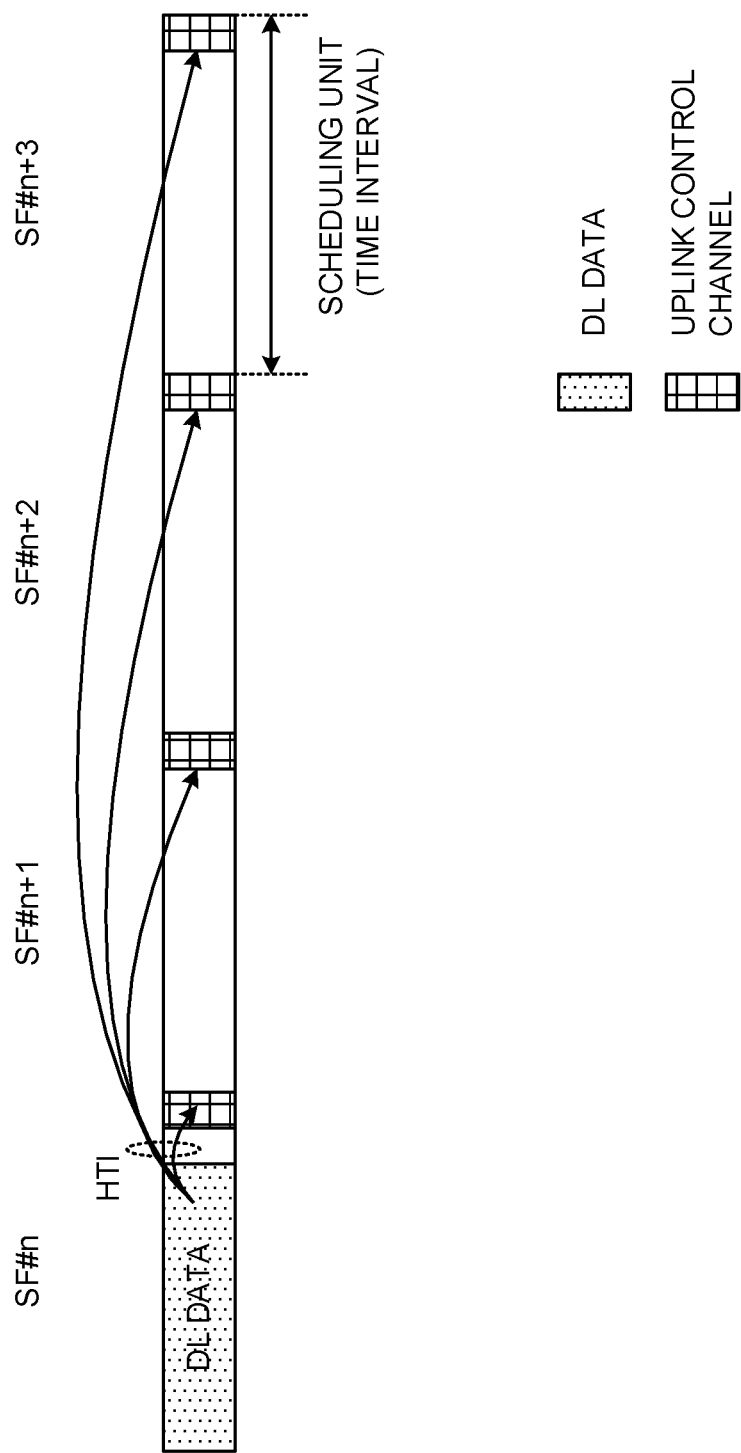
FIG. 2 is a diagram to show an example of control of A/N transmission in response to DL data.

FIG. 2 shows possible examples of A/N transmission timings in response to DL data (for example, the PDSCH). Referring to FIG. 2, DL data is transmitted in a predetermined time interval (here, SF #n) that serves as the DL data scheduling unit, and the timing for transmitting an A/N in response to this is controlled based on information included in the downlink control information transmitted in this SF #n. Note that FIG. 2 shows a case in which a frame structure (see, for example, FIG. 1C) wherein at least DL data, DL control information and UL control information can be transmitted is applied to SF #n, and a frame structure (see FIGS. 1C, 1D and 1F) wherein at least UL control information can be transmitted is applied to SF #n+1 to SF #n+3. Obviously, the frame structure that can be applied to each time interval is not limited to these.

When there is a time interval (hereinafter also referred to as a "subframe") in which DL data is transmitted, the radio base station includes timing information (also referred to as an "HTI (HARQ-ACK timing indicator)"), which specifies the timing for transmitting an A/N in response to the DL data, in the downlink control information, and reports this downlink control information to a user terminal. The user terminal can determine the timing for transmitting an A/N based on the timing information (HTI) included in the downlink control information. The timing information can be constituted by N bits (for example, N=2 or 3).

In addition, the radio base station (eNB, gNB, etc.) may configure the timing information to include in each piece of downlink control information, which is transmitted to different user terminals in the same subframe, with different values. For example, when the radio base station transmits DL data to UE #1 and UE #2 in SF #n, the radio base station can transmit downlink control information that contains pieces of timing information of different values, to UE #1 and UE #2. In this case, UE #1 and UE #2 transmit feedback of A/Ns, at different timings (SFs), in response to the DL data UE #1 and UE #2 each received in SF #n.

In this way, by configuring A/N transmission timings on a per user terminal basis it becomes possible to control A/N feedback flexibly based on user terminals' capabilities, communicating environments and so forth.

The user terminals may transmit capability information regarding the time it takes for the user terminals to process DL data, and/or capability information related to UL data transmission (for example, capability information related to A/N transmission timings) to the radio base station, in advance. Based on the capability information transmitted from the user terminals, the radio base station can control the timing information (HTI) to configure for each user terminal. Note that the radio base station can configure the values to match the bit value (HTI value) of each piece of timing information in the user terminals, in advance, by using higher layer signaling and/or the like. For example, when the timing information is configured in two bits, the radio base station reports pieces of timing information that each correspond to two bits (four types), to the user terminals, through higher layer signaling, and specifies each A/N transmission timing with downlink control information (HTI).

Until the capability information about the time it takes for the user terminals to process DL data and/or the capability information related to UL data transmission are received from the user terminals, the radio base station may use a predetermined value (predetermined timing information) as the timing for A/N transmission, or transmit downlink control information that contains no HTI. Meanwhile, the user terminals may use a predetermined value (predetermined timing information) as the timing for A/N transmission until receiving information about the bit value of timing information (HTI value) from the radio base station. As for the predetermined value, a value that is defined in advance (for example, "four subframes later") can be used.

Also, the user terminals may be controlled so that, if no timing information (HTI) is contained in the downlink control information that schedules DL data, an A/N in response to this DL data is transmitted at a predetermined later timing. As for the predetermined timing, a value that is defined in advance may be used (for example, four subframes later). By this means, even if the user terminals fail to have timing information from the downlink control information (for example, when the downlink control information is mapped in a common search space), the user terminals can still transmit A/Ns appropriately.

Such cases where timing information cannot be obtained from the downlink control information may occur while, for example, initial access procedures, coverage-enhancement control, handover and/or RRC reconfiguration procedures are in progress. During initial access procedures and coverage-enhancement control, it is possible to reduce the overhead and improve the quality of communication by using downlink control information without HTIs. During handover and RRC reconfiguration procedures, the A/N timing may be fixed, without using HTIs, so that the base station and the user terminals can be prevented from recognizing the timing differently.

<Channel Format for A/N Transmission>

When multiple frame structures are used as shown in FIG. 1, there is a possibility that multiple channel formats (for example, uplink control channel formats) are configured for use in A/N transmission. For example, different uplink control channel formats may be applied between frame structures in which UL data is transmitted (see, for example, FIGS. 1D and 1F) and frame structures in which UL data is not transmitted (see, for example, FIG. 1C). Alternatively, multiple uplink control channel formats may be applied to frame structures in which UL data is transmitted.

Therefore, when a plurality of uplink control channel formats are used, it is preferable to report information as to which uplink control channel format is to be used, in every A/N transmission, to user terminals. The user terminals can then select the uplink control channel format to use in A/N transmission based on predetermined information.

For example, the radio base station may include information about the uplink control channel format to use to transmit an A/N, in downlink control information, and report this to a user terminal. In this case, the uplink control channel format to use to transmit the A/N may be included in (associated with) timing information (HTI) that designates the timing for transmitting the A/N. From the timing information (HTI) included in the downlink control information, the user terminal can determine the A/N transmission timing and the uplink control channel format to use. The information about the uplink control channel format may be information to designate an uplink control channel format, or may be information about a frame structure associated with a predetermined uplink control channel format.

Figure 3:
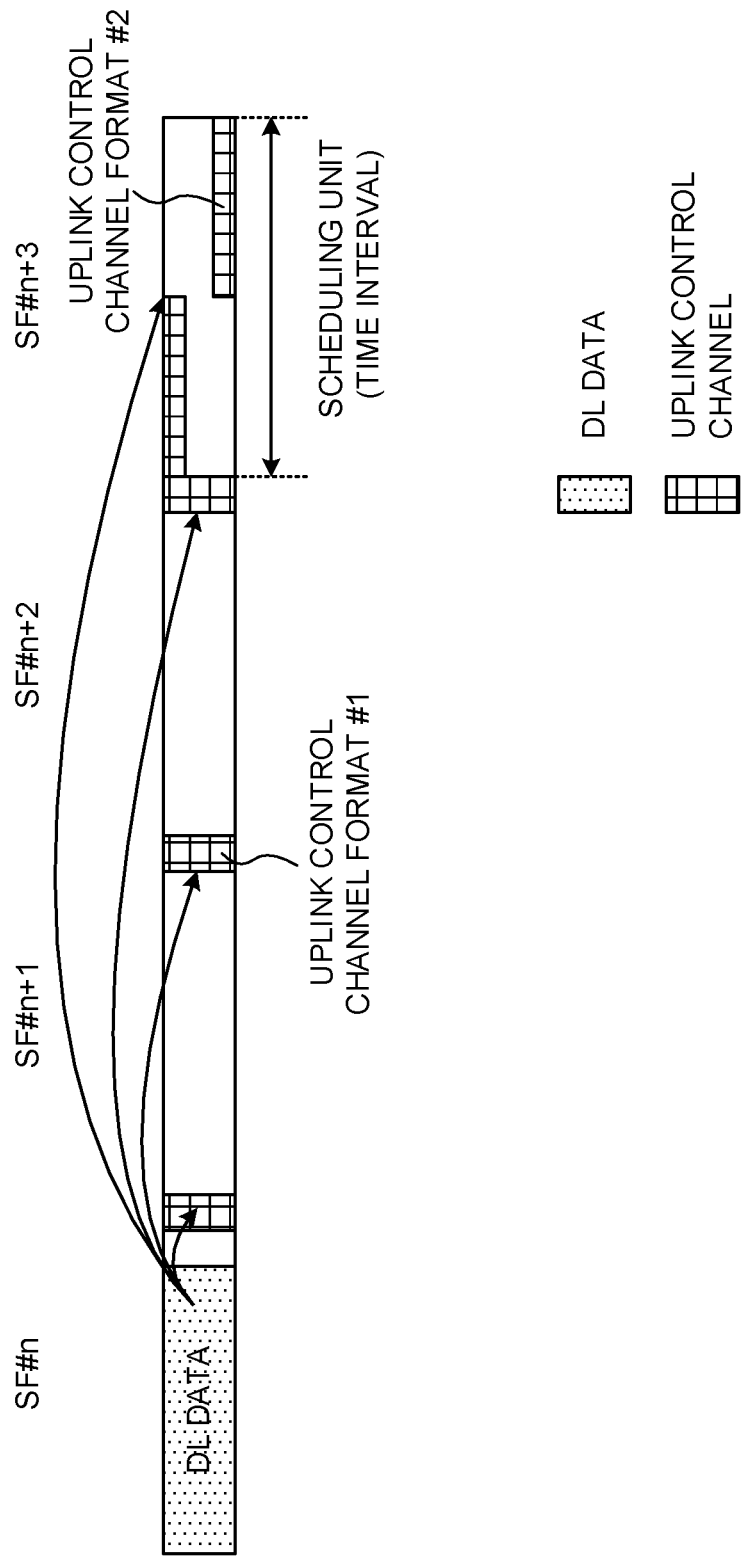
FIG. 3 is a diagram to show another example of control of A/N transmission in response to DL data.

FIG. 3 shows a case where information about the uplink control channel format to use for A/N transmission is included in downlink control information (here, timing information) and transmitted. FIG. 3 shows a case where uplink control channel format #1 is configured in SF #n to #n+2, and uplink control channel format #2 is configured in SF #n+3. When the uplink control channel format is included in timing information, bit values that designate SFs #n, #n+1 and #n+2 as transmission timings are associated with uplink control channel format #1, and bit values that designate SF #n+3 as a transmission timing is associated with uplink control channel format #2.

The uplink control channel format associated with each bit value of timing information (HTI value) may be configured from the radio base station to user terminals in advance, through higher layer signaling and so on, or defined in the specification in advance. Note that information about uplink control channel formats may be provided in downlink control information apart from the timing information (in another bit field).

Alternatively, a user terminal may select the uplink control channel format to use to transmit an A/N based on other parameters (other information). In this case, the user terminal controls the timing for transmitting the A/N based on timing information included in downlink control information, and controls the uplink control channel format to use to transmit this A/N based on other parameters.

Other parameters here include, for example, information about subframes for transmitting A/Ns (for example, information about frame structures). For example, when a subframe in which an A/N is transmitted adopts a frame structure that is used only for UL transmission, the user terminal controls the transmission of A/Ns by using a predetermined uplink control channel format. Information about subframes that are used only for UL transmission (or information about frame structures) may be reported from the radio base station to the user terminal in advance through higher layer signaling and so on.

Figure 4:
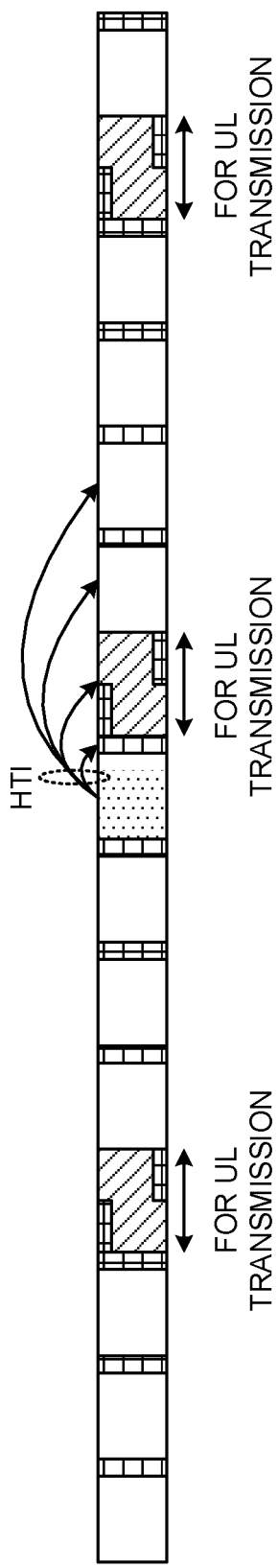
FIG. 4 is a diagram to show another example of control of A/N transmission in response to DL data.

FIG. 4 shows a case where subframes to be used only for UL transmission are provided in a predetermined cycle (here, a cycle of five time intervals). Note that, in the case shown here, the subframes to be used only for UL transmission are configured in a predetermined uplink control channel format (here, uplink control channel format #2), and the other subframes are configured in uplink control channel format #1. The cycle of UL-dedicated subframes, the uplink control channel format that can be applied to each subframe and so forth are not limited to these examples.

Based on information about the cycle of subframes that are used only for UL transmission and timing information that is included in downlink control information (HTI), the user terminal can select the timing for transmitting A/Ns and the uplink control channel format to use. For example, when the HTI in the downlink control information transmitted in a predetermined SF in which DL data is transmitted specifies a UL-dedicated subframe, the user terminal uses uplink control channel format #2. In this way, multiple uplink control channel formats can be flexibly configured by selecting uplink control channel formats based on HTIs and frame structures.

Note that, as for the parameters for selecting uplink control channel formats, other pieces of information can be used, apart from the information about the frame structures applied to subframes (in the event of FIG. 4, information about the cycle of subframes used only for UL transmission).

(Second Aspect)

With a second aspect of the present invention, how to control the bit size (also referred to as "codebook size," "A/N bit sequence") to use in A/N transmission in response to DL transmission will be described below.

Figure 5A:
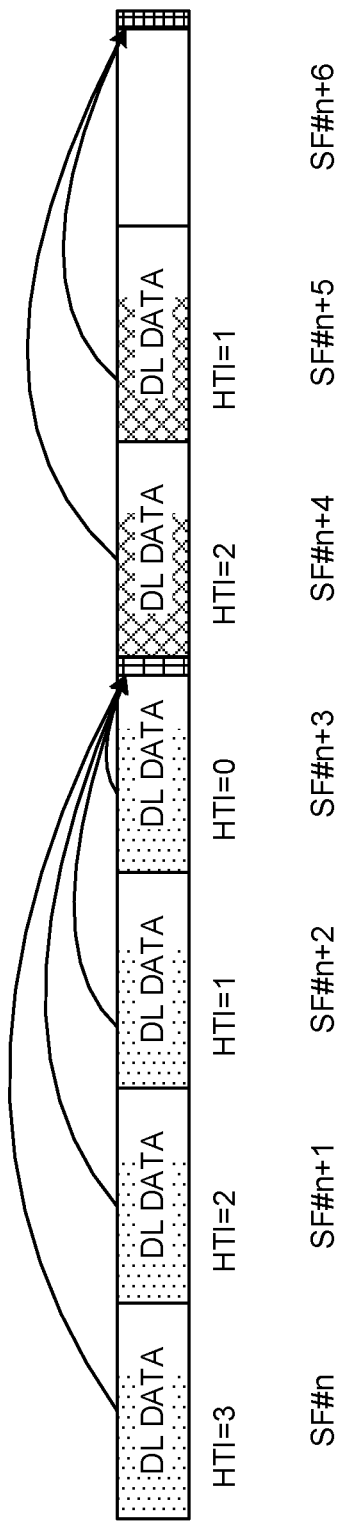
FIGS. 5A and 5B are diagrams to show other examples of control of A/N transmission in response to DL data.

In order to control the timing for transmitting A/Ns in response to DL transmission of different time intervals in a flexible way, it may be possible to transmit feedback of A/Ns in response to DL transmissions of a number of different time intervals by using an uplink control channel in the same time interval (see FIG. 5). In the case shown in FIG. 5A, A/Ns in response to the DL data transmitted respectively in SF #n to #n+3 is mapped to SF #n+3, and A/Ns in response to the DL data transmitted respectively in SF #n+4 and #n+5 is mapped to SF #n+6.

The DL signal (for example, downlink control information) that is transmitted in SF #n includes timing information (HTI) that indicates the timing for transmitting an A/N in response to the DL data transmitted in this SF #n. Here, timing information (HTI=3) to command that an A/N be transmitted in SF #n+3, which is located three subframes later, is included. Similarly, the downlink control information transmitted in SF #n+1 includes timing information (HTI=2), the downlink control information transmitted in SF #n+2 includes timing information (HTI=1), and the downlink control information transmitted in SF #n+3 includes timing information (HTI=0).

Figure 5B:
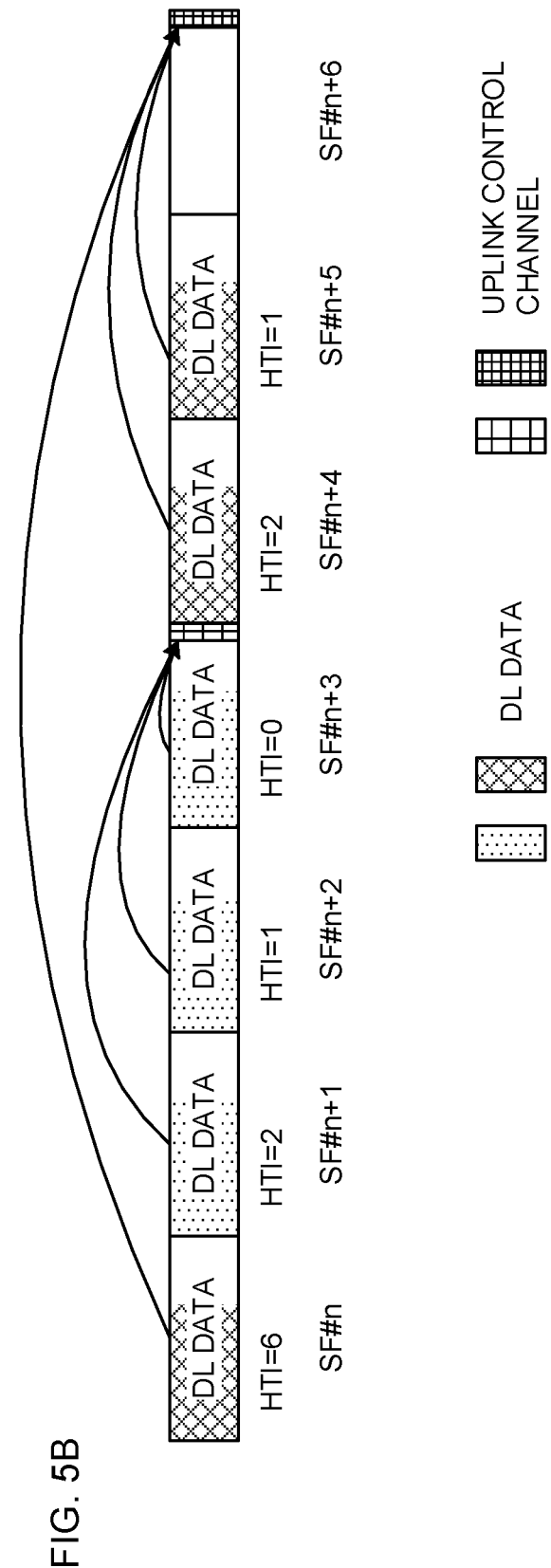

In the case shown in FIG. 5B, A/Ns in response to the DL data transmitted respectively in SF #n+1 to #n+3 is mapped to SF #n+3, and A/Ns in response to the DL data transmitted respectively in SF #n, #n+4 and #n+5 is mapped to SF #n+6. When configuring the timing for transmitting A/Ns flexibly, as shown in FIG. 5B, A/N feedback in response to DL data that is transmitted earlier (here, SF #n) can be transmitted at a later timing than A/Ns in response to DL data that is transmitted later (SF #n+1 to #n+3 in this case).

Referring to FIG. 5B, an A/N in response to the DL data transmitted in SF #n is transmitted in SF #n+6, which is located six subframes later, so that timing information (HTI=6) is included in the downlink control information transmitted in SF #n. Based on the timing information included in the downlink control information, the user terminal can determine the timing for transmitting an A/N in response to each DL data.

As shown in FIG. 5, when configuring the timing for transmitting A/Ns flexibly, the problem lies in how to control the bit sequence (codebook size) of A/Ns transmitted from user terminals. Now, the method for determining the codebook size of A/Ns will be described below.

<Fixed/Semi-Static Configurations>

The codebook size of A/Ns can be configured on a fixed or a semi-static basis, in advance. In the event the codebook size of A/Ns is configured semi-statically, information about codebook sizes may be reported from the radio base station to the user terminal through higher layer signaling and so on. Methods that can be used to configure the codebook size of A/Ns on a fixed or a semi-static basis include a configuration method that is based on A/N bundling in the time direction (method 1), a configuration method that takes into account the maximum number of A/Ns that can be transmitted at a predetermined timing (or the number of time intervals corresponding to A/Ns) (method 2), and a configuration method that takes into account the maximum number of A/Ns that can be transmitted at a predetermined timing and the number of CCs configured (method 3).

(Method 1)

When A/N bundling in the time direction is used, the codebook size of A/Ns can be set to predetermined values (for example, one bit, two bits, and so forth). For example, when MIMO is not used (that is, in the event of one-layer transmission), the user terminal transmits an A/N of one bit by using an uplink control channel in a predetermined time interval. On the other hand, when MIMO is used (that is, in the event of multi-layer transmission), the user terminal transmits an A/N of two bits by using an uplink control channel in a predetermined time interval by applying A/N bundling in the time direction, on a per layer basis. Here, in the event MIMO is used, the number of A/N bits may be three or more, depending on the number of transport blocks or codewords that are multiplexed in MIMO. Note that "A/N bundling" as used herein means finding an exclusive disjunction among a number of A/N detection results and determining an overall A/N detection result.

Figure 6A:
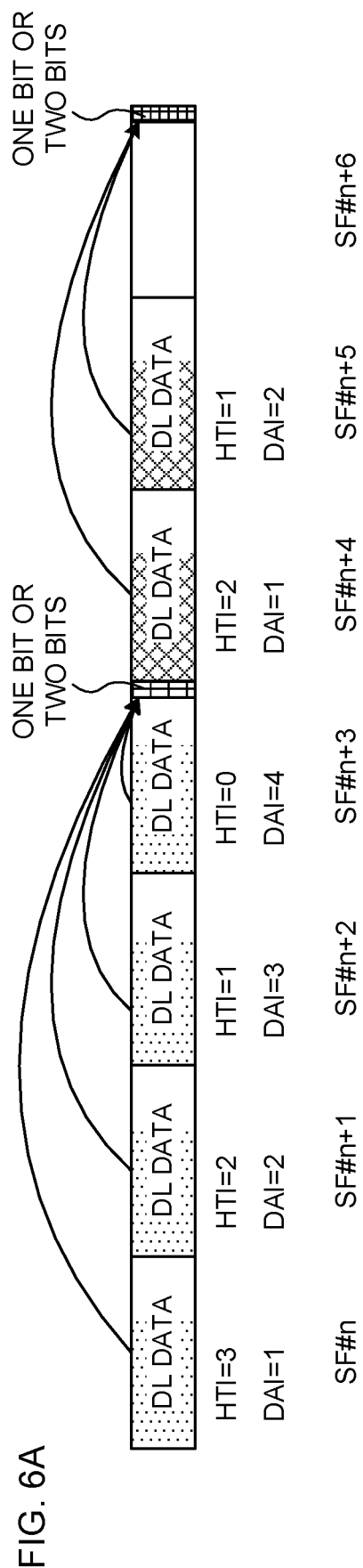
FIGS. 6A and 6B are diagrams to show other examples of control of A/N transmission in response to DL data.

FIG. 6 are diagrams to show examples of A/N feedback using method 1. In the case shown in FIG. 6A, the user terminal transmits A/Ns in response to the DL data transmitted respectively in SF #n to #n+3, in SF #n+3, and transmits A/Ns in response to the DL data transmitted respectively in SF #n+4 and #n+5, in SF #n+6. Based on the timing information (HTI) included in the downlink control information transmitted in each time interval, the user terminal can determine the timing for transmitting an A/N in response to each DL data (an A/N in response to the uplink control channel in a given time interval). Note that the A/Ns can be transmitted using the uplink control channel and/or the uplink data channel in each time interval.

In this case, the user terminal transmits information of one bit (without MIMO) or two bits (with MIMO), in which A/Ns in response to the DL data transmitted in SF #n to #n+3 are bundled, in SF #n+3. For example, when the DL data of SF #n to #n+3 all result in an ACK, the user terminal transmits an ACK as feedback, and, if any of the DL data of SF #n to #n+3 results in a NACK, the user terminal transmits a NACK as feedback. Likewise, the user terminal transmits information of one bit or two bits, in which A/Ns in response to the DL data transmitted in SF #n+4 and #n+5 are bundled, in SF #n+6.

Figure 6B:
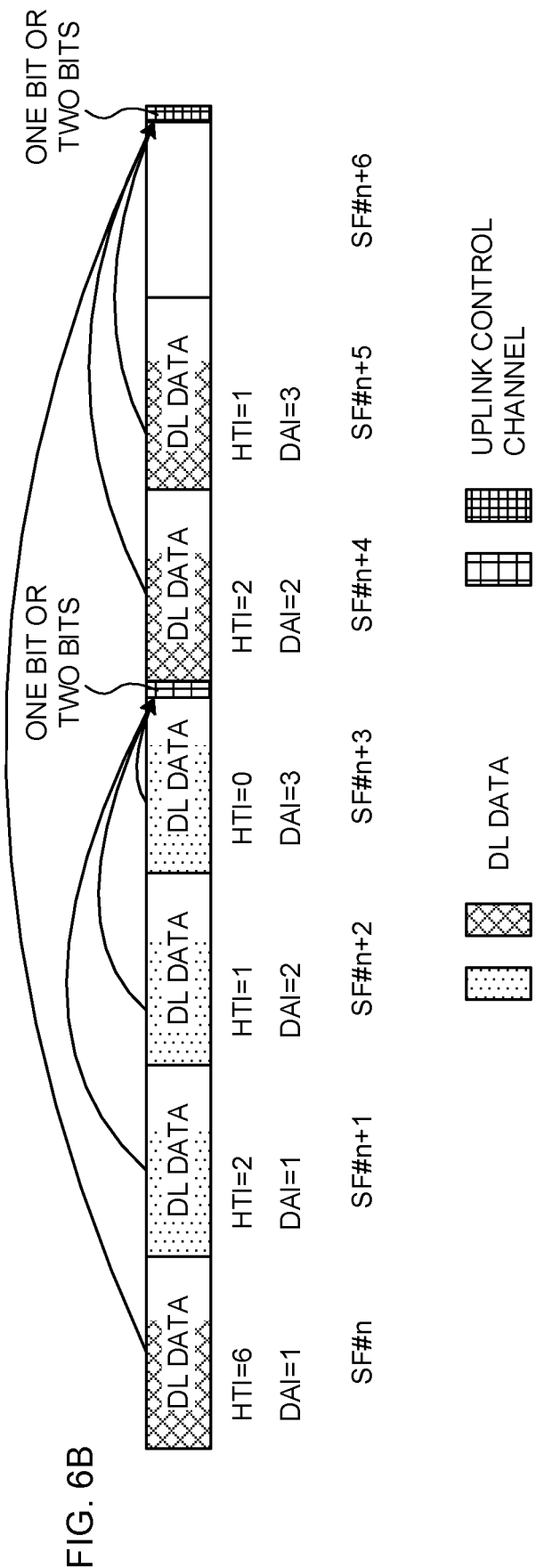

In the case shown in FIG. 6B, the user terminal transmits A/Ns in response to the DL data transmitted in SF #n+1 to #n+3, in SF #n+3, and transmits A/Ns in response to the DL data transmitted in SF #n, #n+4 and #n+5, in SF #n+6. In this case, the user terminal transmits information of one bit (without MIMO) or two bits (with MIMO), in which A/Ns in response to the DL data transmitted in SF #n+1 to #n+3 are bundled, in SF #n+3. Likewise, the user terminal transmits information of one bit or two bits, in which A/Ns in response to the DL data transmitted in SF #n, #n+4 and #n+5 are bundled, in SF #n+6.

In this way, the user terminal determines the timing for transmitting A/N feedback in response to DL transmission in a plurality of time intervals based on timing information, and bundles A/Ns to be transmitted at the same timing (or in the same uplink control channel). By this means, even when A/N transmission timings are to be controlled in a flexible way, it is still possible to transmit A/Ns by using a small number of bits. Also, since bundling is applied only to A/Ns that are transmitted at the same timing (or in the same uplink control channel), which is determined based on predetermined information such as HTI, the base station and the user terminal can have shared understanding as to which data's A/Ns are bundled, so that feedback of A/Ns can be transmitted properly.

In addition, the radio base station may include a DL assignment index (DAI (Downlink Assignment Indicator (Index))) in downlink control information that schedules DL data, and report this to the user terminal. The DAI is a value that is assigned to each scheduled subframe, and is used to identify (count) the scheduled subframe. Note that the information to use to count scheduled subframes is also referred to as "counter DAIs."

For example, in the downlink control information in subframes in which DL data is scheduled, the radio base station configures counter DAIs, corresponding to these subframes, respectively, and transmits the downlink control information. The counter DAIs to be included in each subframe's downlink control information can be configured in ascending order, based on subframe indices and/or the like. FIG. 6A shows a case where the radio base station includes timing information (HTI=3) and a counter DAI (DAI=1) in the downlink control information to be transmitted in SF #n, and transmits this downlink control information to the user terminal. Similarly, the radio base station includes HTI=2/DAI=2 in the downlink control information to be transmitted in SF #n+1, HTI=1/DAI=3 in the downlink control information to be transmitted in SF #n+2, and HTI=0/DAI=4 in the downlink control information to be transmitted in SF #n+3, and reports these to the user terminal.

Note that, if a DAI is constituted by N bits, the value of a DAI may be calculated by M mod $2^N$. For example, referring to FIG. 6A, in the event of N=2, DAI=0 is included, instead of DAI=4. Upon receiving DAI=0, the user terminal can judge that the cumulative value is four.

When the user terminal receives DL signals in a plurality of subframes if the values of counter DAIs (the cumulative value, count value) included in each subframe's downlink control information are not continuous, the user terminal can judge that the user terminal has failed to detect the subframes corresponding to the counter DAIs that were not detected. Referring to FIG. 6A, if the user terminal fails to detect the DL signal of SF #n+2, the user terminal cannot get the downlink control information that shows the counter DAI=3, so that the user terminal can judge that the user terminal has failed to detect the DL signal corresponding to this counter DAI=3.

In this way, by using counter DAIs, the user terminal can accurately identify which time intervals the user terminal has failed to detect. The user terminal can send A/N feedback by selecting a NACK for the missed time intervals.

Also, counter DAIs can be used in units of groups of DL data, in response to which A/Ns are transmitted at the same timing (or in the same uplink control channel) (in FIG. 6A, the A/N transmission group comprised of SF #n to #n+3, and the A/N transmission group comprised of SF #n+4 to SF #n+5).

In FIG. 6B, the radio base station includes HTI=2/DAI=1 in the downlink control information to be transmitted in SF #n+1, HTI=1/DAI=2 in the downlink control information to be transmitted in SF #n+2, and HTI=0/DAI=3 in the downlink control information to be transmitted in SF #n+3, and reports these to the user terminal. Also, the radio base station includes HTI=6/DAI=1 in the downlink control information to be transmitted in SF #n, HTI=2/DAI=2 in the downlink control information to be transmitted in SF #n+4, and HTI=1/DAI=3 in the downlink control information to be transmitted in SF #n+5, and reports these to the user terminal.

However, even when counter DAIs are used, if the subframe (SF #n+3) with the largest counter DAI included in the downlink control information among the scheduled subframes (SF #n to #n+3 in FIG. 6A) fails to be detected, the user terminal cannot notice this failed detection. Therefore, when the last scheduled subframe (the subframe including the largest counter DAI) in an A/N transmission group fails being detected, one of following options 1 to 3 may be used to control A/N transmission properly.

In option 1, in a given A/N transmission group, A/Ns are transmitted by using the uplink control channel that corresponds to the downlink control information (or the downlink control channel) scheduling the last DL data amongst the DL data the user terminal has detected. In this case, individual uplink control channel resources for use for transmitting A/Ns in response to each DL data may be set. The radio base station can identify the A/N detection failure (the subframe in which the user terminal received the last DL data) in the user terminal based on in which resources feedback of A/Ns from the user terminal is allocated. For example, in FIG. 6A, uplink control channel resources are set for the downlink control information of SF #n to #n+3, and the user terminal transmits A/Ns by using the uplink control channel resource corresponding to the DL data (or the downlink control information) in the time interval that is received last.

In option 2, a total DAI, which represents information related to the number (total number) of subframes that are scheduled, is configured. In this case, in addition to counter DAIs, the radio base station includes information that indicates the number of subframes in which DL transmission is scheduled (total DAI), in the downlink control information of each subframe, and reports this downlink control information to the user terminal. For example, in FIG. 6A, total DAIs are included in every downlink control information in SF #n to #n+3 (here, the total DAI=4), and reported to the user terminal. By this means, the user terminal can determine how much DL data is (or how many time intervals are) actually scheduled in each A/N transmission group.

In option 3, in a given A/N transmission group, information that identifies the downlink control information (or downlink control channel) that schedules the DL data to be transmitted last (LDI (Last Downlink assignment Index, Last Downlink grant Indicator, etc.)) is included in downlink control information and reported to the user terminal. For example, the radio base station toggles the LDI to be included in the downlink control information for scheduling the last DL data, and does not toggle the LDIs included in the downlink control information for scheduling other DL data.

To be more specific, the radio base station can include LDI=1 in the downlink control information to be transmitted in the subframe having the largest SF index among the subframes in which DL data is transmitted and LDI=0 in the downlink control information to be transmitted in the other subframes, and report these to the user terminal. For example, in FIG. 6A, the radio base station includes LDI=0 in the downlink control information of SF #n to #n+2 and LDI=1 in the downlink control information of SF #n+3, and reports these to the user terminal. If the user terminal fails to detect the downlink control information containing LDI=1, the user terminal can judge that the user terminal has failed to receive the last-scheduled DL data, and control A/N transmission accordingly.

(Method 2)

It is possible to set the codebook size of A/Ns to predetermined values (for example, M bits or 2M bits), taking into account the maximum number of A/Ns (or the number of time intervals corresponding to A/Ns) that can be transmitted at a predetermined timing. When MIMO is not used (that is, in the event of one-layer transmission), the user terminal transmits M bits of A/Ns by using an uplink control channel in a predetermined time interval. On the other hand, when MIMO is used (that is, in the event of multi-layer transmission), the user terminal transmits, for example, 2M bits of A/Ns by using an uplink control channel in a predetermined time interval.

M is set to the same value as the maximum number of A/Ns to be transmitted at one timing (at the same timing), or set to a greater value than that. When the timing information (HTI) is provided in N bits, M can be set to the same value as $2^N$ or $2 \times 2^N$, or set to a greater value than that.

Figure 7:
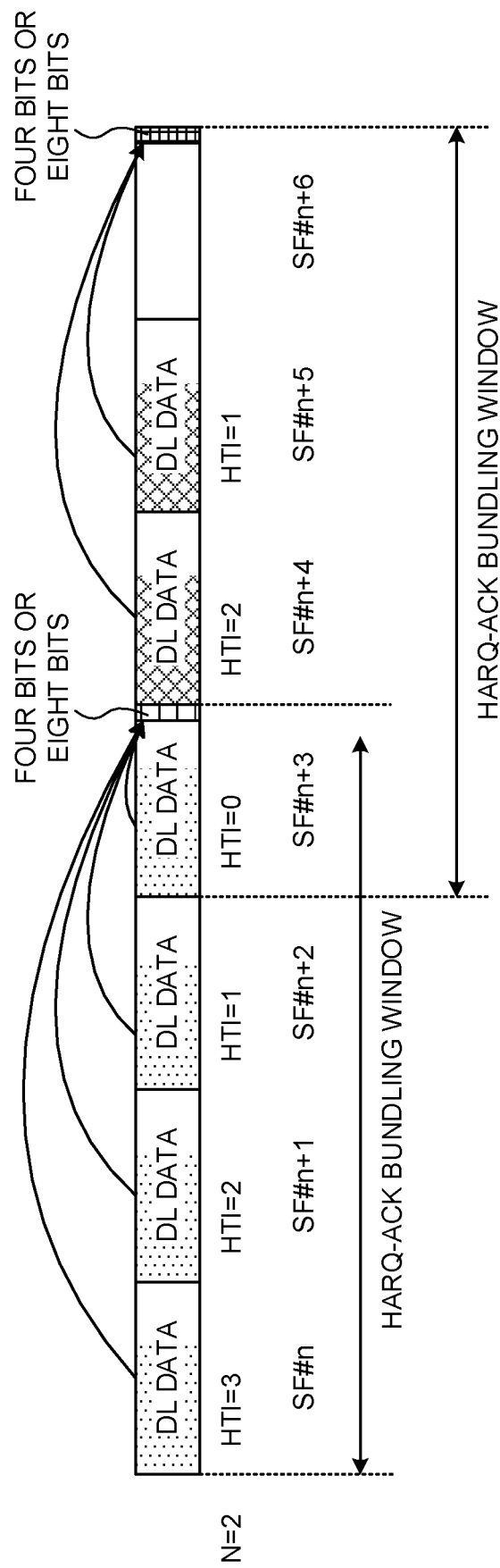
FIG. 7 is a diagram to show another example of control of A/N transmission in response to DL data.

For example, the case shown in FIG. 7 assumes that the user terminal transmits A/Ns in response to the DL data transmitted respectively in SF #n to #n+3, in SF #n+3, and transmits A/Ns in response to the DL data transmitted respectively in SF #n+4 and #n+5, in SF #n+6. When the timing information (HTI) is configured in two bits (N=2), the number of A/Ns that can be transmitted at the same timing (for example, in the uplink control channel of SF #3) is a maximum of four in the time direction. Therefore, it is possible to control A/N transmission by configuring the A/N codebook size to M=4 (without MIMO) or M=8 (with MIMO).

Also, the user terminal configures the range in which A/N feedback is sent at the same timing (also referred to as "window," "HARQ-ACK feedback window," "HARQ-ACK bundling window," and/or the like). For example, when the user terminal detects downlink control information that schedules DL data corresponding to a predetermined HTI value, the user terminal selects the window where the time interval in which this DL data is scheduled is included. Then, the user terminal generates A/N bits to match this window and controls feedback accordingly.

The HARQ-ACK bundling window can be selected based on the value of M. For example, the user terminal configures, as a window, M consecutive time intervals, including at least a time interval in which timing information (HTI) is received. In this case, the user terminal may configure M consecutive time intervals going backward from a predetermined time interval (for example, the time interval in which A/Ns are transmitted), as a window.

In the case shown in FIG. 7, the user terminal sets a window over the range of SF #n to #n+3, for A/N transmission in SF #n+3, and sets a window over the range of SF #n+3 to SF #n+6, for A/N transmission in SF #n+6. The user terminal also controls A/N transmission (for example, NACK transmission) by setting a window even in time intervals where DL data is not actually scheduled (for example, SF #n+6).

In addition, when the user terminal transmits M bits of A/Ns as feedback, the user terminal can control the order in which these A/N bits are arranged, based on HTI values. For example, the user terminal can generate A/N bit sequences in descending order from the A/N bit corresponding to the DL data of the largest HTI value.

(Method 3)

In method 3, the codebook size of A/Ns is configured, on a fixed or a semi-static basis, based on the number of CCs (cells) that are configured in the user terminal, in addition to the number of A/Ns that can be transmitted at a predetermined timing (or the number of time intervals corresponding to A/Ns) used in method 2. For example, the A/N codebook size is M×K bits (without MIMO) or 2M×K bits (with MIMO).

Here, K corresponds to the number of CCs that are configured in the user terminal. Note that, the number of CCs may be the number of CCs to share the same uplink control channel (for example, CCs that are configured, among the CCs of a cell group comprised of a cell where PUCCH transmission takes place). M can be defined in the same way as in above method 2. Also, the HARQ-ACK bundling window can be configured as in method 2. That is, in method 3, the A/N codebook size is increased by the number of CCs in method 2 to control A/Ns.

The value of the timing information (HTI value) that is included in downlink control information (or a downlink control channel) for scheduling DL data can be made a common value between different CCs. In this case, the user terminal can transmit A/Ns in different CCs by using the same uplink control channel of the same time interval.

<Dynamic Configuration>

The user terminal may dynamically configure the A/N codebook size and control A/N transmission. When the codebook size of A/Ns is configured dynamically, the user terminal determines the codebook size to match the A/Ns that are actually sent as feedback, based on, for example, the number of time intervals (scheduling units) in which DL data is scheduled.

For example, the user terminal can determine the A/N codebook size based on the timing information (HTI) and counter DAIs that are included in DL-data-scheduling downlink control information. The counter DAIs can be configured as in method 1 described above. In this way, by controlling the codebook size in a dynamic manner, it is possible to prevent the overhead when transmitting A/Ns from increasing. Also, the throughput of communication can be improved by changing and controlling the timing for A/N transmission and the codebook size dynamically based on timing information (HTI).

Also, if the subframe that is scheduled last (the subframe with the largest counter DAI) in an A/N transmission group fails to be detected, A/N transmission can be controlled properly by using one of options 1 to 3 in method 1. For example, when total DAIs are included in downlink control information (option 2), the user terminal can determine the codebook size in each A/N transmission, based on the total DAIs, in addition to HTIs and counter DAIs.

(Third Aspect)

With a third aspect of the present invention, an example of the method for controlling uplink transmission power in A/N transmission in response to DL transmission will be described below.

In existing LTE systems, the transmission power of uplink signals is controlled based on transmission power control (TPC) commands and/or others that are included in downlink control information. TPC commands that control the transmission power of an uplink control channel (PUCCH) is included in a downlink control channel (PDCCH/EPDCCH) that transmits DCI formats 1A/1B/1D/1/2A/2/2B/2C/2D, a downlink control channel (MPDCCH) that transmits DCI formats 6-1A, and a downlink control channel (PDCCH/MPDCCH) that transmits DCI formats 3/3A. The CRC parity bits of DCI format 3/3A are scrambled by RNTIs for TPC (TPC-PUCCH-RNTIs).

When the user terminal transmits a PUCCH in a subframe (SF #i), the user terminal controls the transmission power of this PUCCH based on following equation 1, according to the TPC command included in the subframe (SF #i−$k_m$) that is located a predetermined value (for example, $k_m$) before.

$$g(i) = g(i-1) + \sum_{m=0}^{M-1} \delta_{PUCCH}(i-k_m) \quad \text{(Equation 1)}$$

In equation 1, g(i) is the current state of PUCCH power control adjustment (or the "current PUCCH power control adjustment state"), and g(0) is the first value after reset. M is the number of subframes corresponding to the TPC command.

In the event of FDD, or FDD-TDD CA (in the event the primary cell uses FDD), the transmission power of the PUCCH is controlled based on M=1 and $k_0$=4. In the event of TDD, the values of M and $k_m$ are defined and used per UL subframe, based on UL/DL configurations (see FIG. 8).

FIG. 8 shows an example of a table, in which M and $k_m$, which are used in PUCCH transmission in each UL subframe in TDD, are defined per UL/DL configuration. For example, when a user terminal transmits a PUCCH in SF #2 of UL/DL configuration #1, the user terminal controls the transmission power of the PUCCH based on above equation 1, where M=2, and $k_m$=7 and 6 are given.

Note that, if there are multiple Ms (that is, in the event of M>1), the user terminal can control PUCCH transmission power by using TPC commands transmitted in multiple DL subframes (for example, Rel. 8). Alternatively, when there are a number of Ms (that is, in the event of M>1), the user terminal can control PUCCH transmission power by using the TPC command transmitted in one DL subframe (for example, the earliest DL subframe in the time direction), and use the bit values of other TPC command for other purposes (for example, to specify PUCCH resources) and so on (Rel. 10 or later versions).

As described above, in existing LTE systems, the transmission power of uplink signals is determined based on transmission power control (TPC) commands included in downlink control information transmitted in predetermined subframes and/or the like. However, as described above, there is no fixed rule as to how TPC commands should be used when the timing for A/N feedback is controlled dynamically. For example, when the timing for transmitting A/Ns is controlled based on timing information (HTI) included in downlink control information, the problem lies in how to control uplink transmission power (for example, the transmission power of an uplink control channel) in A/N transmission.

Therefore, in the present embodiment, a TPC command that is included in downlink control information is used at the same timing as the timing for A/N feedback reported in timing information (HTI) (method 1). Alternatively, a TPC command that is included in downlink control information is used at a predetermined timing, regardless of what A/N feedback timing is reported in timing information (HTI) (method 2).

Figure 9:
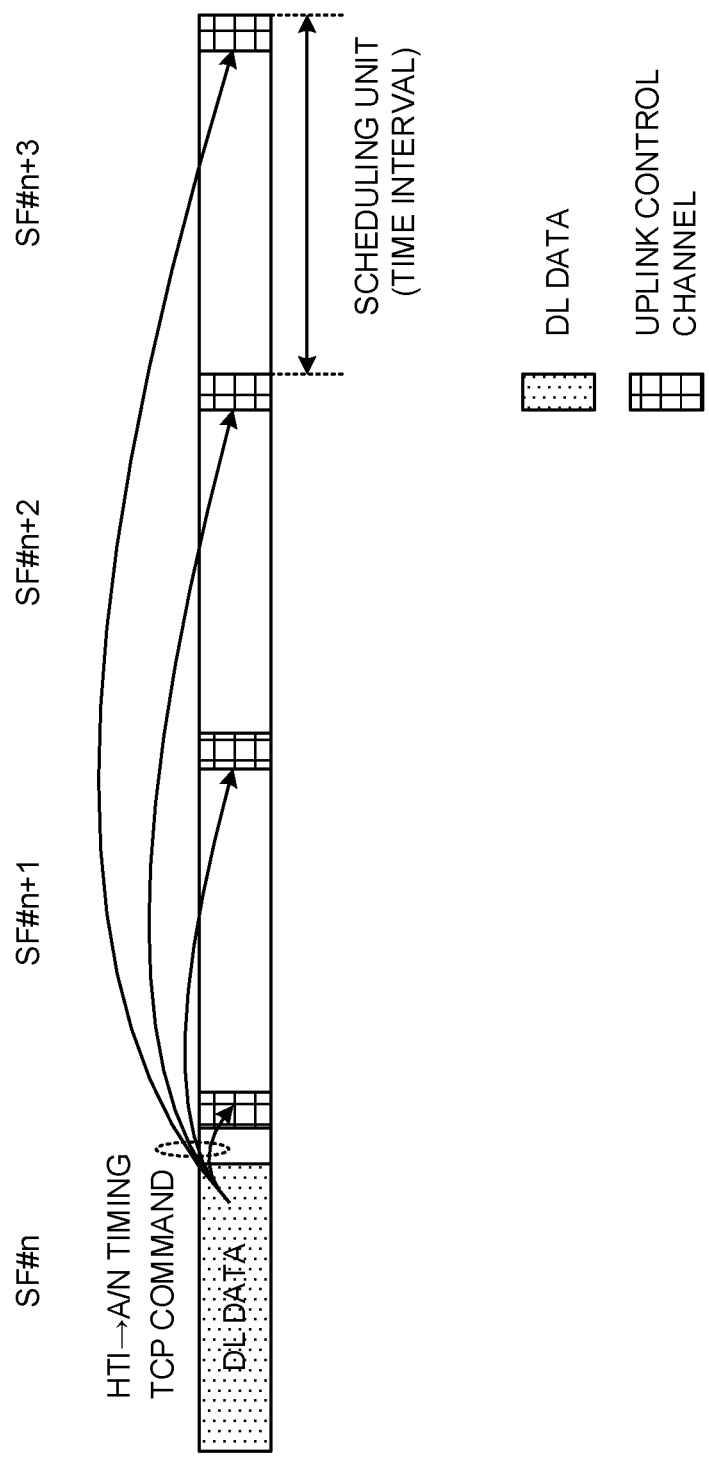
FIG. 9 is a diagram to explain transmission power control in A/N transmission in response to DL data.

Now, assume the case where the timing (SF) for transmitting an A/N in response to the DL data of SF #n is determined based on timing information (HTI) that is included in the downlink control information transmitted in this SF #n (see FIG. 9).

According to method 1, the TPC command included in the downlink control information of SF #n is used to control the transmission power of a UL signal (for example, an uplink control channel) in the SF specified by the HTI. For example, in FIG. 9, when an A/N in response to the DL data of SF #n is transmitted in SF #n+3 (HTI=3), the TPC command included in the downlink control information of SF #n is used to control the transmission power for the A/N transmission (for example, an uplink control channel) in SF #n+3.

Furthermore, when A/Ns in response to a number of pieces of DL data are transmitted at the same timing, it is possible to control the transmission power of the uplink control channel by using the TPC command included in the downlink control information that schedules one of the DL data. For example, only the TPC command included in the downlink control information that schedules the DL data to be transmitted first (or that has the largest HTI) may be used. Alternatively, only the TPC command included in the downlink control information that schedules the DL data to be transmitted last (or that has the smallest HTI) may be used. Alternatively, the transmission power of the uplink control channel may be controlled by using a plurality of TPC commands included in separate pieces of downlink control information that each schedule DL data.

In this way, by controlling the timing for using TPC commands based on timing information (HTI), even when the radio base station commands switching of the value of the HTI, the user terminal can be controlled so that transmission power mirrors TPC commands at any timing the radio base station desires.

According to method 2, the TPC command that is included in the downlink control information of SF #n is used to control the transmission power of a UL signal (for example, an uplink control channel) in a predetermined SF, regardless of which SF is specified by the HTI. For example, the TPC command in or after the SF of the earliest timing which the HTI can designate to the user terminal can be used. When the same subframe as a subframe (here, SF #n) in which DL data is transmitted can be specified as an A/N transmission timing (that is, when HTI=0 can be designated), the TPC command included in the downlink control information of SF #n is used for UL transmission in this SF #n.

By applying TPC commands to UL signals at predetermined timings regardless of the value of the HTI, it is possible to reserve the time required to control transmission power and/or the time required to calculate power headroom report (PHR) information related to transmission power, in the user terminal.

(Radio Communication System)

Now, the structure of a radio communication system according to the present embodiment will be described below. In this radio communication system, the radio communication methods according to the above-described embodiments are employed. Note that the radio communication method according to each embodiment described above may be used alone or may be used in combination.

Figure 10:
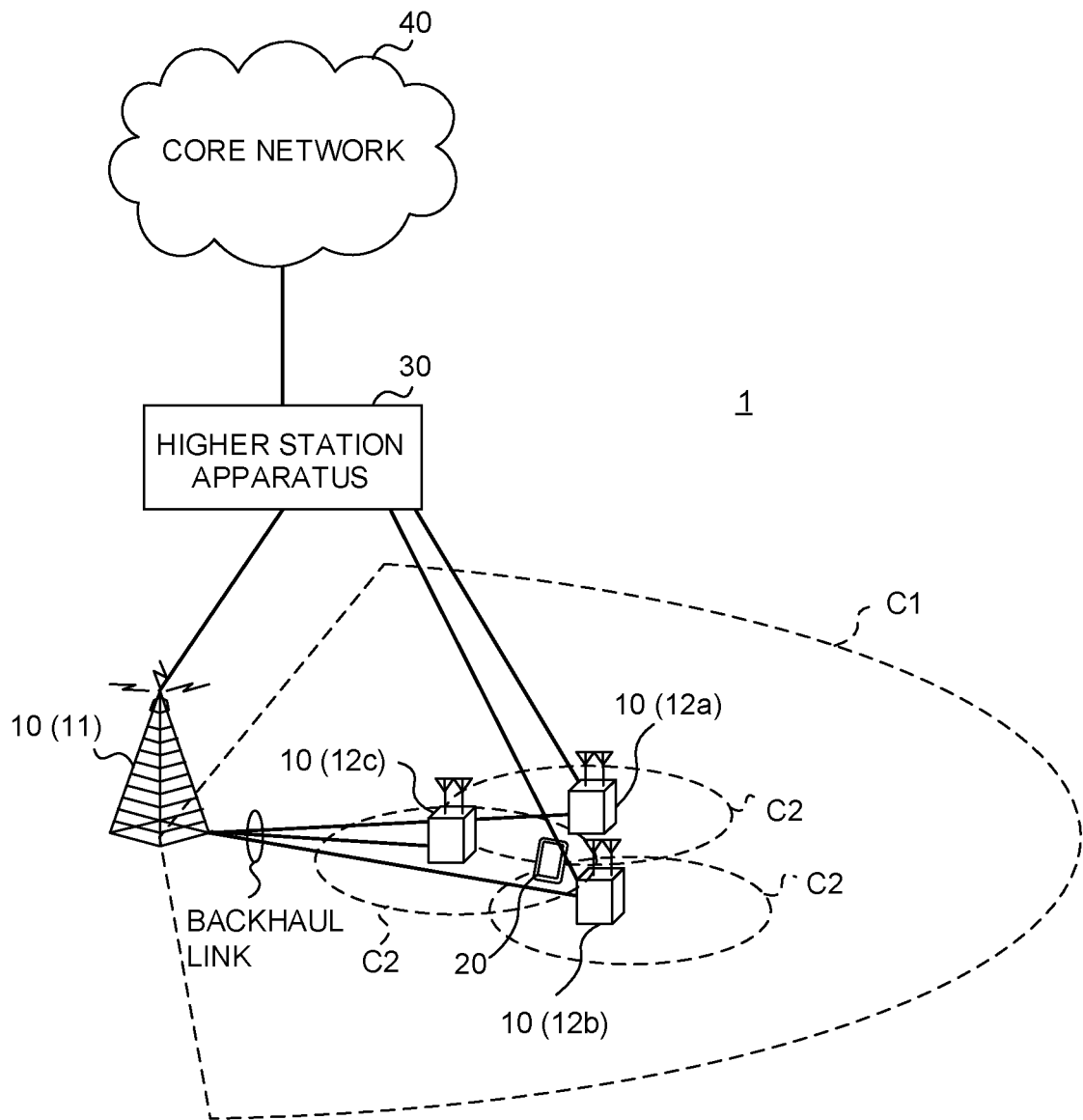
FIG. 10 is a diagram to show an exemplary schematic structure of a radio communication system according to the present embodiment.

FIG. 10 is a diagram to show an exemplary schematic structure of a radio communication system according to the present embodiment. A radio communication system 1 can adopt carrier aggregation (CA), which groups a number of fundamental frequency blocks (component carriers (CCs)) into one, using LTE system bandwidth (for example, 20 MHz) as one unit, and/or dual connectivity (DC), which uses a plurality of cell groups (CGs) that each accommodate one or more CCs. Note that the radio communication system 1 may be also referred to as "SUPER 3G," "LTE-A (LTE-Advanced)," "IMT-Advanced," "4G," "5G," "FRA (Future Radio Access)," "NR (New RAT (New Radio Access Technology))," and so on.

The radio communication system 1 shown in FIG. 10 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells and/or within cells may be adopted here.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells.

Furthermore, the user terminals 20 can communicate based on time division duplexing (TDD) or frequency division duplexing (FDD) in each cell. A TDD cell and an FDD cell may be referred to as a "TDD carrier (frame structure type 2)" and an "FDD carrier (frame structure type 1)," respectively.

Furthermore, in each cell (carrier), a single numerology may be employed, or a plurality of different numerologies may be employed. As used herein, "numerology" refers to frequency-domain and time-domain parameters, such as subcarrier spacing, symbol duration, cyclic prefix duration, subframe duration and so on.

Between the user terminals 20 and the radio base station 11, communication can be carried out using a carrier of a relatively low frequency band (for example, 2 GHz) and a narrow bandwidth (referred to as, for example, an "existing carrier," a "legacy carrier," and/or the like). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL.

DL channels that are used in the radio communication system 1 include a DL shared channel that is shared by each user terminal 20 (also referred to as "PDSCH (Physical Downlink Shared CHannel)," "DL data channel" and so forth), a broadcast channel (PBCH (Physical Broadcast CHannel)), L1/L2 control channels and so on. User data, higher layer control information, SIBs (System Information Blocks) and so forth are communicated in the PDSCH. Also, the MIB (Master Information Block) is communicated in the PBCH.

The L1/L2 control channels include DL control channels (such as PDCCH (Physical Downlink Control CHannel), EPDCCH (Enhanced Physical Downlink Control CHannel), etc.), PCFICH (Physical Control Format Indicator CHannel), PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. Retransmission control information (for example, at least one of A/N, NDI, HPN, and redundancy version (RV)) pertaining to UL signals (for example, PUSCH) can be communicated using at least one of the PHICH, the PDCCH, and the EPDCCH.

UL channels that are used in the radio communication system 1 include a UL shared channel that is shared by each user terminal 20 (also referred to as "PUSCH (Physical Uplink Shared CHannel)," "UL data channel" and/or the like), a UL control channel (PUCCH (Physical Uplink Control CHannel)), a random access channel (PRACH (Physical Random Access CHannel)) and so on. User data, higher layer control information and so on are communicated by the PUSCH. Uplink control information (UCI), including at least one of retransmission control information (for example, A/N) for DL signals (for example, PDSCH), channels state information (CSI), and a scheduling request (SR) is communicated in the PUSCH or the PUCCH. By means of the PRACH, random access preambles for establishing connections with cells are communicated.

(Radio Base Station)

Figure 11:
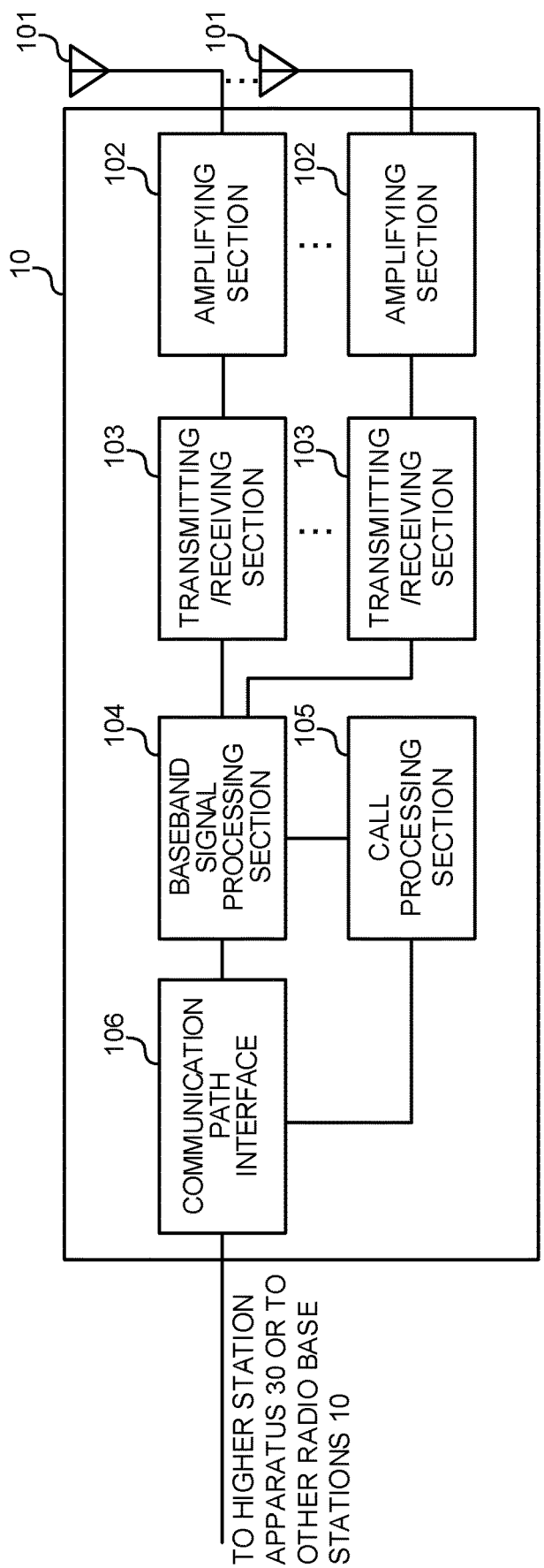
FIG. 11 is a diagram to show an exemplary overall structure of a radio base station according to the present embodiment.

FIG. 11 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to the transmitting/receiving sections 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 103 can be constituted by a transmitters/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with neighboring radio base stations 10 via an inter-base station interface (which is, for example, optical fiber in compliance with the CPRI (Common Public Radio Interface), the X2 interface, etc.).

In addition, the transmitting/receiving sections 103 transmit downlink control information that includes at least one of information (HTI) regarding the timing for transmitting an A/N in response to DL transmission, a counter DAI, a total DAI, an LDI and a TPC command for controlling transmission power upon A/N transmission. In addition, the transmitting/receiving sections 103 receive uplink control information (UCI), including A/Ns in response to a DL shared channel.

Figure 12:
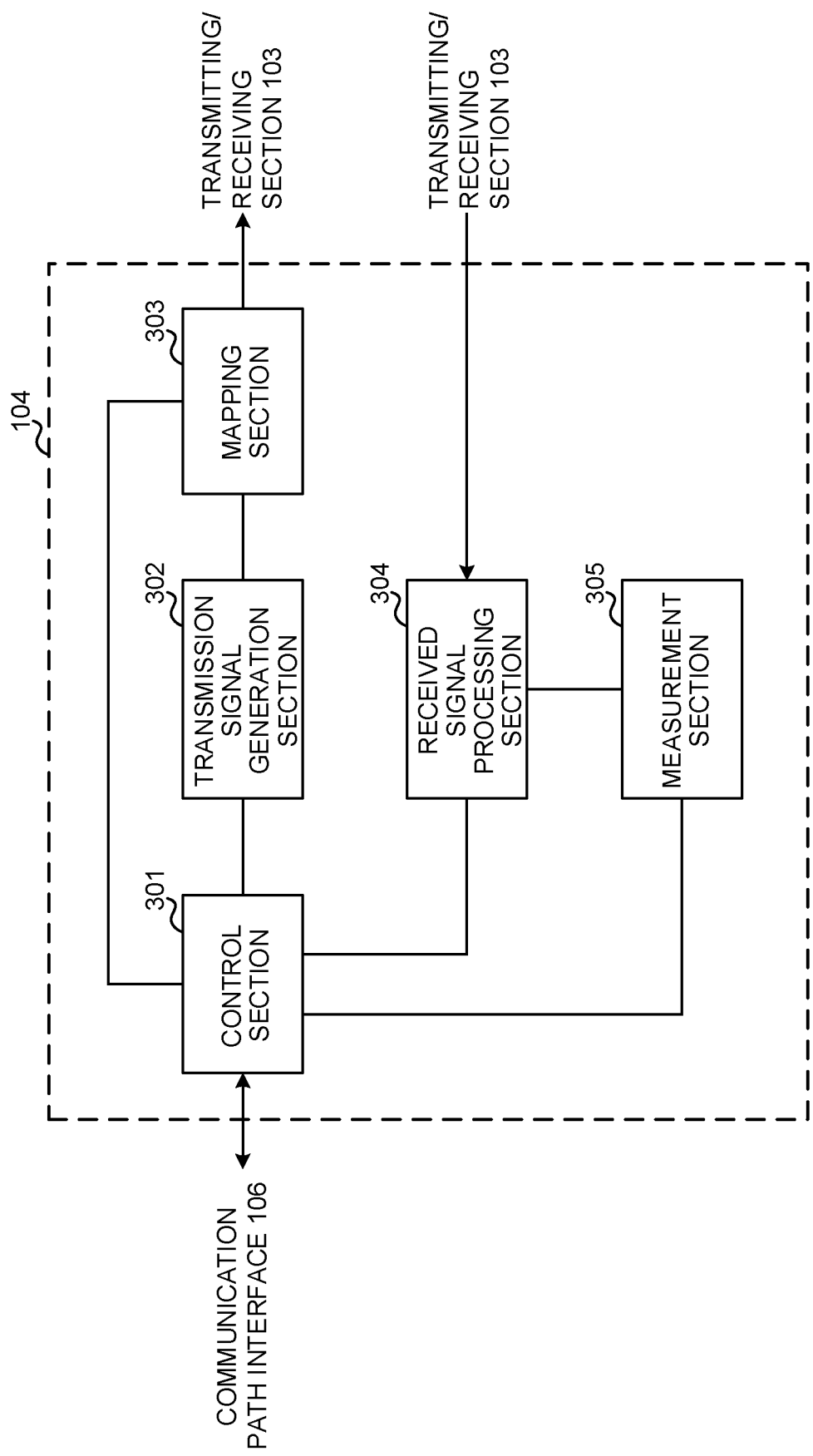
FIG. 12 is a diagram to show an exemplary functional structure of a radio base station according to the present embodiment.

FIG. 12 is a diagram to show an exemplary functional structure of a radio base station according to the present embodiment. Note that, although FIG. 12 primarily shows functional blocks that pertain to characteristic parts of the present embodiment, the radio base station 10 has other functional blocks that are necessary for radio communication as well. As shown in FIG. 12, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, generation of DL signals in the transmission signal generation section 302, mapping of DL signals in the mapping section 303, receiving processes (for example, demodulation) for UL signals in the received signal processing section 304, and measurements in the measurement section 305.

To be more specific, the control section 301 performs scheduling for user terminals 20. For example, the control section 301 schedules the PUSCH and/or the PDSCH for the user terminals 20.

In addition, the control section 301 controls the timing for transmitting A/Ns in response to DL transmission, and controls the transmission of information related to the transmission timing (HTI) (see FIG. 2). The control section 301 can be constituted by a controller, a control circuit or control apparatus that can be described based on general understanding of the technical field to which the present invention pertains.

Based on commands from the control section 301, the transmission signal generation section 302 generates DL signals (including DL data, DCI, UL data retransmission control information, higher layer control information and so on), and outputs these DL signals to the mapping section 303.

The transmission signal generation section 302 can be constituted by a signal generator, a signal generating circuit or signal generating apparatus that can be described based on general understanding of the technical field to which the present invention pertains.

Based on commands from the control section 301, the mapping section 303 maps the DL signals generated in the transmission signal generation section 302 (for example, DL data, DCI, UL data retransmission control information, higher layer control information and so on) to predetermined radio resources, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and/or other processes) on UL signals (for example, UL data, UCI and so forth) transmitted from the user terminals 20. To be more specific, the received signal processing section 304 performs receiving processes on UL signals based on the numerology configured in the user terminals 20. To be more specific, the received signal processing section 304 may output the received signals and/or the signals after receiving processes to the measurement section 305. In addition, the received signal processing section 304 performs receiving processes on A/Ns in response to DL signals, and outputs ACKs or NACKs to the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure UL channel quality based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 13:
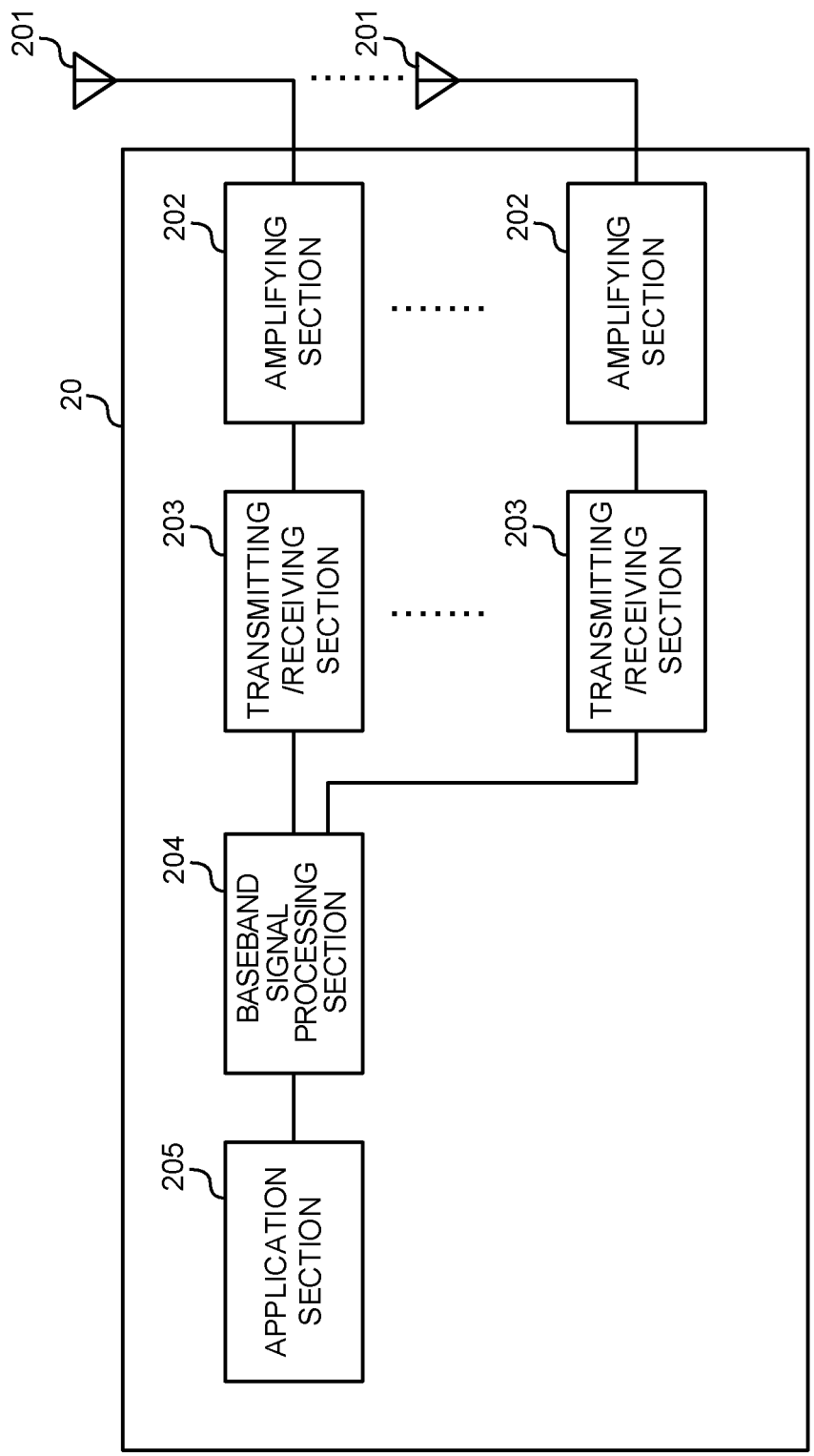
FIG. 13 is a diagram to show an exemplary overall structure of a user terminal according to the present embodiment.

FIG. 13 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in multiple transmitting/receiving antennas 201 are amplified in the amplifying sections 202. The transmitting/receiving sections 203 receive DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to at least one of an FFT process, error correction decoding, a retransmission control receiving process and so on. The DL data is forwarded to the application section 205. The application section 205 performs processes related to higher layers above the physical layer and the MAC layer. Also, the broadcast information is also forwarded to application section 205.

Meanwhile, UL data is input from the application section 205 to the baseband signal processing section 204. The baseband signal processing section 204 performs transmission processes for retransmission control (for example, an HARQ transmission process), channel coding, rate matching, puncturing, a discrete Fourier transform (DFT) process, an IFFT process and so on, and the result is forwarded to each transmitting/receiving section 203. UCI (for example, at least one of DL retransmission control information, CSI and an SR) is also subjected to channel coding, rate matching, puncturing, a DFT process, an IFFT process and so on, and forwarded to each transmitting/receiving section 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, the transmitting/receiving sections 203 receive downlink control information including at least one of information (HTI) regarding the timing for transmitting A/Ns in response to DL transmission, a counter DAI, a total DAI, an LDI and a TPC command for controlling transmission power upon A/N transmission. In addition, the transmitting/receiving sections 203 transmit uplink control information (UCI) that includes A/Ns in response to a DL shared channel.

A transmitting/receiving section 203 can be constituted by a transmitter/receiver, a transmitting/receiving circuit or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 14:
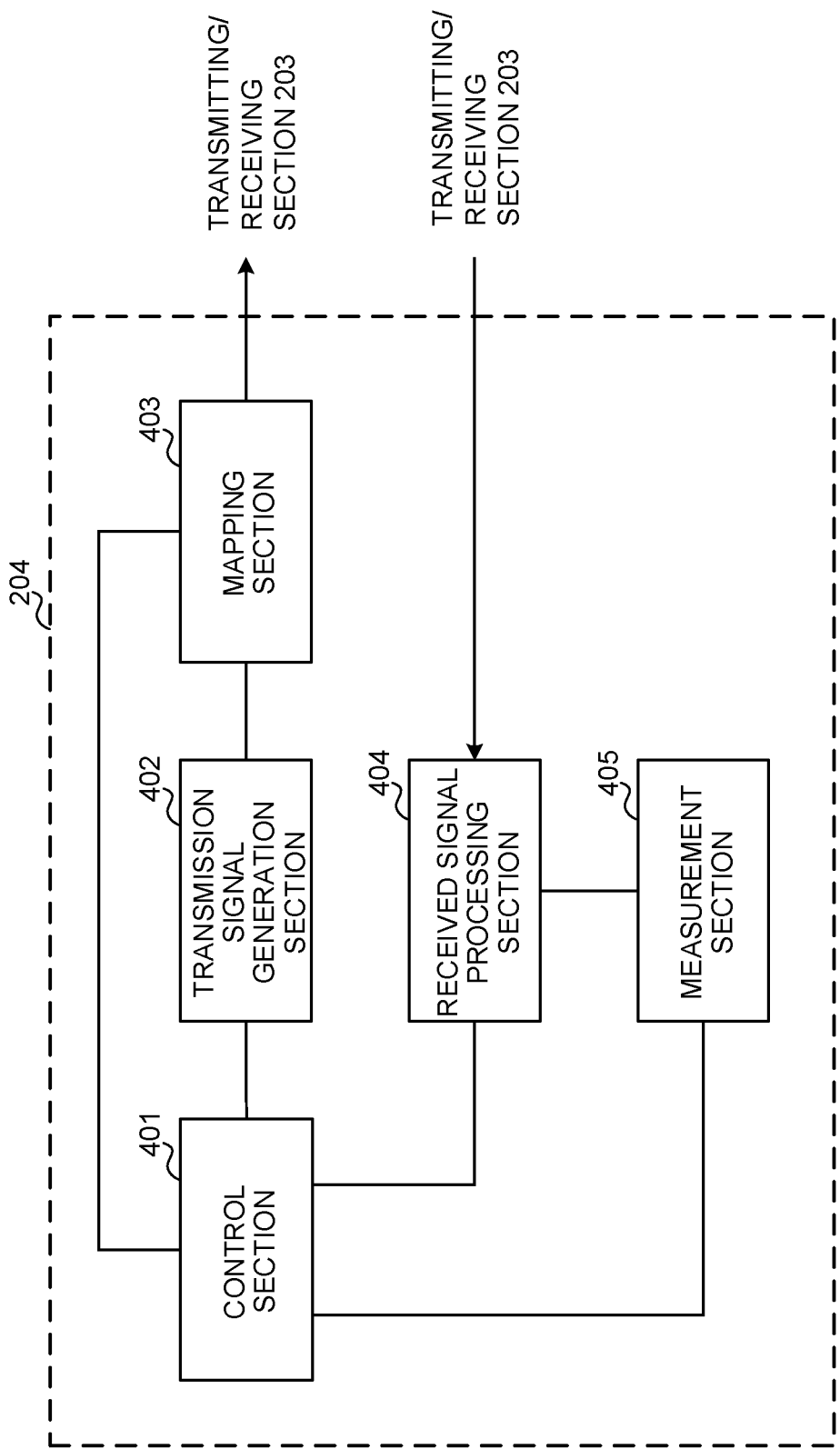
FIG. 14 is a diagram to show an exemplary overall structure of a user terminal according to the present embodiment.

FIG. 14 is a diagram to show an exemplary functional structure of a user terminal according to the present embodiment. Note that, although FIG. 14 primarily shows functional blocks that pertain to characteristic parts of the present embodiment, the user terminal 20 has other functional blocks that are necessary for radio communication as well. As shown in FIG. 14, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405 and so on.

To be more specific, the control section 401 controls the transmission of A/Ns in response to downlink data. For example, the control section 401 controls the timing for transmitting an A/N based on timing information (HTI) that is included in downlink control information (see FIG. 2 and FIG. 5). If no timing information is included in the downlink control information, the control section 401 controls the A/N to be transmitted at a predetermined timing. Furthermore, the control section 401 can determine which uplink control channel is used for the A/N based on information about an uplink control channel format, included in the downlink control information, and/or a parameter apart from the downlink control information (see FIG. 3 and FIG. 4).

Furthermore, the control section 401 selects the feedback window and/or the codebook size corresponding to an A/N based at least on timing information included in downlink control information (see FIG. 7). Furthermore, the control section 401 controls the codebook size of an A/N based at least on timing information and a counter DAI included in downlink control information. Furthermore, the control section 401 controls the transmission power of an A/N based on a transmission power control command included in downlink control information with timing information (HTI), or based on a transmission power control command included in downlink control information transmitted a predetermined period before (see FIG. 9).

The control section 401 can be constituted by a controller, a control circuit or control apparatus that can be described based on general understanding of the technical field to which the present invention pertains.

The transmission signal generation section 402 generates UL signals (including UL data, UCI, UL reference signals and so forth) as commanded from the control section 401 (the generation collectively referring to, for example, performing processes such as encoding, rate matching, puncturing, modulation, and/or other processes), and outputs these to the mapping section 403. The transmission signal generation section 402 can be constituted by a signal generator, a signal generating circuit or signal generating apparatus that can be described based on general understanding of the technical field to which the present invention pertains.

The mapping section 403 maps the UL signals generated in the transmission signal generation section 402 to radio resources, as commanded from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so forth) for DL signals (DL data, DCI, higher layer control information, and so on). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CRS and/or CSI-RS) from the radio base station 10, and outputs the measurement results to the control section 401.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 15:
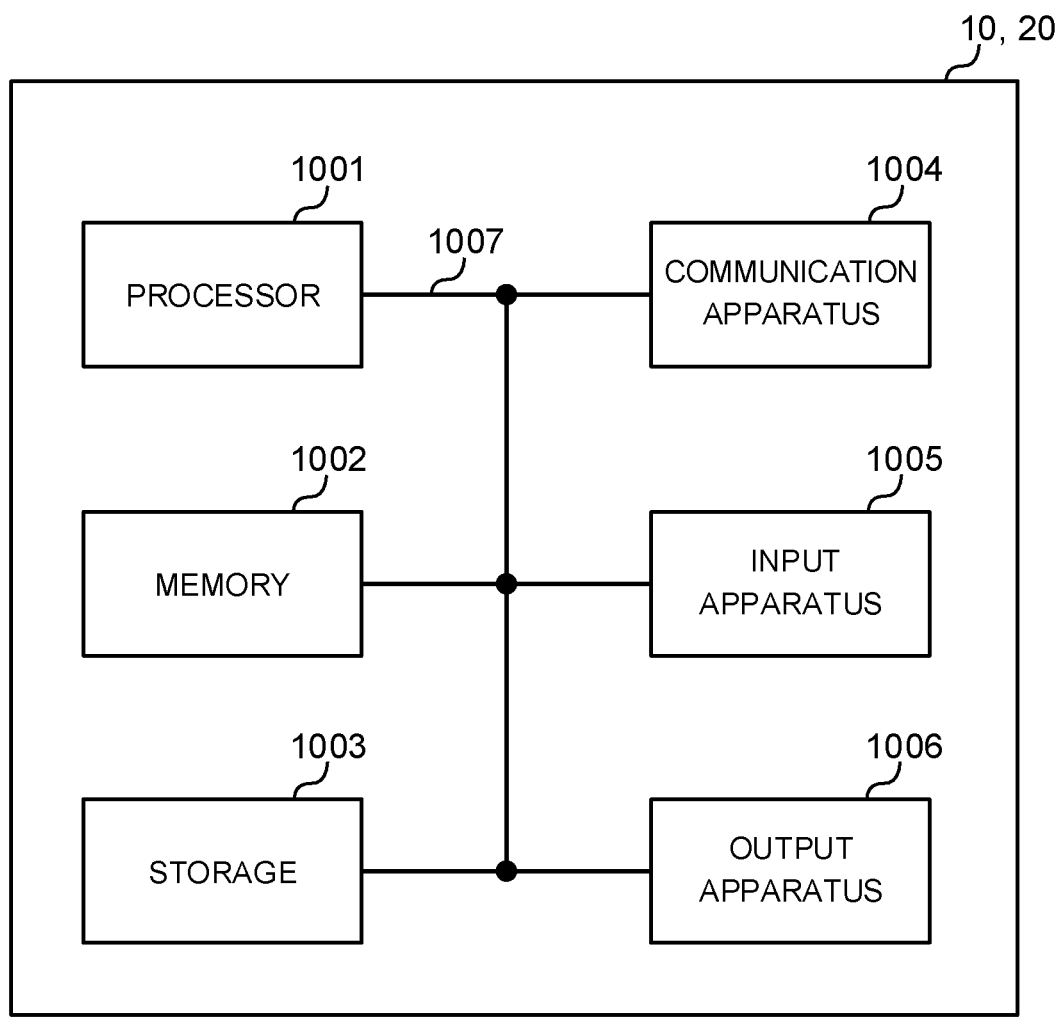
FIG. 15 is a diagram to show an exemplary hardware structure of a radio base station and a user terminal according to the present embodiment.

That is, a radio base station, a user terminal and so on according to an embodiment of the present invention may function as a computer that executes the processes of the radio communication method of the present invention. FIG. 15 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit to use when communicating signals. A radio frame, a subframe, a slot and a symbol may be each called by other equivalent names. For example, one subframe may be referred to as a "transmission time interval (TTI)," or a plurality of consecutive subframes may be referred to as a "TTI," or one slot may be referred to as a "TTI." That is, a subframe and a TTI may be a subframe (1 ms) in existing LTE, may be a shorter period than 1 ms (for example, one to thirteen symbols), or may be a longer period of time than 1 ms. Note that the unit to represent a TTI may be referred to as a "slot," a "minislot," a "scheduling unit" and so on, instead of a "subframe."

Here, a TTI refers to the minimum time unit of scheduling in radio communication, for example. For example, in LTE systems, a radio base station schedules the allocation of radio resources (such as the frequency bandwidth and/or the transmission power that can be used by each user terminal) for each user terminal in TTI units. Note that the definition of TTIs is not limited to this. TTIs may be transmission time units for channel-encoded data packets (transport blocks), or may be the unit of processing in scheduling, link adaptation and so on.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on. Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI long. One TTI and one subframe may be each comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, symbols and so on described above are merely examples. For example, configurations such as the number of subframes included in a radio frame, the number of slots included in a subframe, the number of symbols and RBs included in a slot, the number of subcarriers included in an RB, the number of symbols in a TTI, the duration of symbols and the duration of cyclic prefixes (CPs) can be changed in a variety of ways.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information). Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a structure in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and/or optical regions (both visible and invisible).

When terms such as "include," "comprise" and other variations of these terms are used in this specification or in claims, such terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-184787, filed on Sep. 21, 2016, including the specification, drawings and abstract, is incorporated herein by reference in its entirety.

The invention claimed is:

1. A terminal comprising:
a receiver that receives a downlink control information; and
a processor that controls a transmission timing of a delivery acknowledgment signal corresponding to a downlink shared channel based on a HARQ-ACK timing indicator that is a first information included in the downlink control information, and determines an uplink control channel format that is used with a transmission of the delivery acknowledgement signal based on a second information that is included in the downlink control information,
wherein the second information is provided apart from the first information in another bit field of the downlink control information.

2. The terminal according to claim 1, wherein when the first information is not included in the downlink control information, the processor transmits the delivery acknowledgement signal at predetermined timing.

3. The terminal according to claim 1, wherein the transmission timing candidates of the delivery acknowledgement signal are configured by higher layer signaling.

4. The terminal according to claim 2, wherein the transmission timing candidates of the delivery acknowledgement signal are configured by higher layer signaling.

5. A radio communication method comprising: receiving a downlink control information; and
controlling a transmission timing of a delivery acknowledgment signal corresponding to a downlink shared channel based on a HARQ-ACK timing indicator that is a first information included in the downlink control information, and determining an uplink control channel format that is used with a transmission of the delivery acknowledgement signal based on a second information that is included in the downlink control information,
wherein the second information is provided apart from the first information in another bit field of the downlink control information.

* * * * *